(12) United States Patent
Yamada et al.

(10) Patent No.: US 11,380,209 B2
(45) Date of Patent: Jul. 5, 2022

(54) INFORMATION PROCESSING APPARATUS

(71) Applicant: NTT DOCOMO, INC., Tokyo (JP)

(72) Inventors: Takefumi Yamada, Tokyo (JP); Ken Koumoto, Tokyo (JP); Youhei Oono, Tokyo (JP); Hidetoshi Ebara, Tokyo (JP); Yuichiro Segawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 98 days.

(21) Appl. No.: 16/761,383

(22) PCT Filed: Oct. 30, 2018

(86) PCT No.: PCT/JP2018/040372
§ 371 (c)(1),
(2) Date: May 4, 2020

(87) PCT Pub. No.: WO2019/093197
PCT Pub. Date: May 16, 2019

(65) Prior Publication Data
US 2020/0334992 A1 Oct. 22, 2020

(30) Foreign Application Priority Data

Nov. 10, 2017 (JP) .............................. JP2017-217216

(51) Int. Cl.
*G06F 19/00* (2018.01)
*G06G 7/70* (2006.01)
(Continued)

(52) U.S. Cl.
CPC ........... *G08G 5/0039* (2013.01); *B64C 39/02* (2013.01); *B64F 1/36* (2013.01); *G06Q 50/10* (2013.01);
(Continued)

(58) Field of Classification Search
CPC .. G08G 5/0039; G08G 5/0026; G08G 5/0043; G08G 5/006; G08G 5/0069; B64C 39/02; B64F 1/36; G06Q 50/10
See application file for complete search history.

(56) References Cited

U.S. PATENT DOCUMENTS 9,997,080 B1* 6/2018 Chambers ............ G08G 5/0034
2010/0106346 A1* 4/2010 Badli ..................... G01C 23/00
701/3
(Continued)

FOREIGN PATENT DOCUMENTS

| JP | 2011024133 A | 2/2011 |
| JP | 2017062724 A | 3/2017 |
| WO | 2017115807 A1 | 7/2018 |

OTHER PUBLICATIONS

International Search Report issued in corresponding PCT Application No. PCT/JP2018/040372, dated Jan. 15, 2019, 2 pages.
(Continued)

*Primary Examiner* — Harry Y Oh
*Assistant Examiner* — Sohana Tanju Khayer
(74) *Attorney, Agent, or Firm* — MKG, LLC

(57) ABSTRACT

Allocation result accumulation unit accumulates allocation results of each business operator that requests allocation of flight airspace of drone. Allocation result accumulation unit accumulates, as the allocation results, an allocated airspace amount represented by the size of allocated flight airspace and the period in which flight in the flight airspace is permitted. When allocation requests are received from multiple business operators, flight airspace allocation unit allocates flight airspace by giving priority to a high priority business operator according to the allocation results accumulated in allocation result accumulation unit with respect to each business operator. Flight airspace allocation unit allocates the flight airspace by assigning a higher priority to a business operator for which the allocated airspace amount that has been accumulated is small.

11 Claims, 12 Drawing Sheets

(51) Int. Cl.
*G06G 7/76* (2006.01)
*G08G 5/00* (2006.01)
*B64F 1/36* (2017.01)
*G06Q 50/10* (2012.01)
*B64C 39/02* (2006.01)

(52) U.S. Cl.
CPC ........... *G08G 5/006* (2013.01); *G08G 5/0026* (2013.01); *G08G 5/0043* (2013.01); *G08G 5/0069* (2013.01)

(56) References Cited

U.S. PATENT DOCUMENTS

| | | | | |
|---|---|---|---|---|
| 2016/0086102 | A1* | 3/2016 | Elf | G06Q 10/087 |
| | | | | 705/5 |
| 2017/0278409 | A1* | 9/2017 | Johnson | G08G 5/0026 |
| 2018/0253978 | A1* | 9/2018 | Tabuchi | B64C 39/024 |
| 2018/0261103 | A1* | 9/2018 | de Oliveira | G08G 5/0091 |
| 2019/0250643 | A1* | 8/2019 | Takizawa | B64C 39/024 |
| 2021/0097870 | A1* | 4/2021 | Nakadai | G06Q 20/1235 |

OTHER PUBLICATIONS

Notice of Reasons for Refusal issued in corresponding Japanese Patent Application No. 2019-552737, dated Aug. 3, 2021.

\* cited by examiner

| DRONE ID | DEPARTURE POINT | WAYPOINT | DESTINATION | ESTIMATED DEPARTURE TIME | ESTIMATED ARRIVAL TIME |
|---|---|---|---|---|---|
| D001 | WAREHOUSE α1 | INTERSECTION β1 | STORE γ1 | T1 | T2 |
| D002 | PORT α2 | INTERSECTION β2 | BUILDING γ2 | T3 | T4 |

FIG. 5

| CELL ID | CENTER COORDINATES | AIRSPACE ATTRIBUTES | | | | |
|---|---|---|---|---|---|---|
| | | LENGTH OF ONE SIDE | FLIGHT PERMISSION | SHARING PERMISSION | SPEED LIMIT | ... |
| C01_01 | x1,y1,z1 | L1 | ○ | ○ | Slmt1 | ... |
| C02_01 | x2,y1,z1 | L1 | ○ | ○ | Slmt1 | ... |
| ... | ... | ... | ... | ... | ... | ... |
| C20_20 | x20,y20,z1 | L1 | ○ | × | Slmt2 | ... |
| C21_20 | x21,y20,z1 | L1 | ○ | × | Slmt2 | ... |
| ... | ... | ... | ... | ... | ... | ... |
| C98_99 | x98,y99,z1 | L1 | × | — | — | ... |
| C99_99 | x99,y99,z1 | L1 | × | — | — | ... |

| DRONE ID | FLIGHT AIRSPACE (CELL ID) | FLIGHT PERMITTED PERIOD |
|---|---|---|
| D001 | R11(C0101,C0201,··,C2001) | K11(T111~T112) |
| | R12(C2001,C2002,··,C2020) | K12(T121~T122) |
| | R13(C2020,C2120,··,C4320) | K13(T131~T132) |
| D002 | R21(C4005,C3905,··,C2005) | K21(T211~T212) |
| | R22(C2005,C2006,··,C2015) | K22(T221~T222) |
| | R23(C2015,C1915,··,C0515) | K23(T231~T232) |
| | R24(C0515,C0516,··,C0530) | K24(T241~T242) |

| BUSINESS OPERATOR | ALLOCATION RESULTS ||||| ALLOCATED AIRSPACE AMOUNT |
|---|---|---|---|---|---|
| | ALLOCATION DATE | ALLOCATION REQUEST | ALLOCATED CELL | ALLOCATION PERIOD | |
| A BUSINESS OPERATOR | 10/30 | D001 (THIRD TIME) | C5020 | wt11 | SumA1 |
| | | | C4920 | wt12 | |
| | | | ... | ... | |
| | | ... | ... | ... | |
| | ... | ... | ... | ... | |
| B BUSINESS OPERATOR | 10/30 | D002 (FIRST TIME) | C0530 | wt21 | SumB1 |
| | | | C0529 | wt22 | |
| | | | ... | ... | |
| | | ... | ... | ... | |
| | ... | ... | ... | ... | |
| C BUSINESS OPERATOR | 10/30 | D003 (SECOND TIME) | C3030 | wt31 | SumC1 |
| | | | C3029 | wt32 | |
| | | | ... | ... | |
| | | ... | ... | ... | |
| | ... | ... | ... | ... | |

FIG. 10

| BUSINESS OPERATOR | ALLOCATION DATE | ALLOCATION REQUEST | ALLOCATION RESULTS | | | |
|---|---|---|---|---|---|---|
| | | | ALLOCATED CELL | ALLOCATION PERIOD | NUMBER OF DRONES THAT SIMULTANEOUSLY USE FLIGHT AIRSPACE | ALLOCATED AIRSPACE AMOUNT |
| A BUSINESS OPERATOR | ... | ... | C5020 | wt11 | num11 | SumA1 |
| | | ... | C4920 | wt12 | num12 | |
| | ... | ... | ... | ... | ... | |
| | | ... | ... | ... | ... | |
| B BUSINESS OPERATOR | ... | ... | C0530 | wt21 | num21 | SumB1 |
| | | ... | C0529 | wt22 | num22 | |
| | ... | ... | ... | ... | ... | |
| | | ... | ... | ... | ... | |
| C BUSINESS OPERATOR | ... | ... | C3030 | wt31 | num31 | SumC1 |
| | | ... | C3029 | wt32 | num32 | |
| | ... | ... | ... | ... | ... | |
| | | ... | ... | ... | ... | |

FIG. 13

| BUSINESS OPERATOR | ALLOCATION DATE | ALLOCATION REQUEST | ALLOCATION RESULTS | | | | ALLOCATED AIRSPACE AMOUNT |
|---|---|---|---|---|---|---|---|
| | | | ALLOCATED CELL | ALLOCATION PERIOD | SPEED LIMIT | | |
| A BUSINESS OPERATOR | ... | ... | C5020 | wt11 | Slmt11 | | SumA1 |
| | | | C4920 | wt12 | Slmt12 | | |
| | | | ... | ... | ... | | |
| | | ... | ... | ... | ... | | |
| | | | ... | ... | ... | | |
| B BUSINESS OPERATOR | ... | ... | C0530 | wt21 | Slmt21 | | SumB1 |
| | | | C0529 | wt22 | Slmt22 | | |
| | | | ... | ... | ... | | |
| | | ... | ... | ... | ... | | |
| | | | ... | ... | ... | | |
| C BUSINESS OPERATOR | ... | ... | C3030 | wt31 | Slmt31 | | SumC1 |
| | | | C3029 | wt32 | Slmt32 | | |
| | | | ... | ... | ... | | |
| | | ... | ... | ... | ... | | |
| | | | ... | ... | ... | | |

FIG. 14

| BUSINESS OPERATOR | ALLOCATION DATE | ALLOCATION REQUEST | ALLOCATION RESULTS ||||
|---|---|---|---|---|---|---|
| | | | ALLOCATED CELL | ALLOCATION PERIOD | ALLOCATION REQUEST AMOUNT FOR SAME TIME ZONE | ALLOCATED AIRSPACE AMOUNT |
| A BUSINESS OPERATOR | ... | D001 (THIRD TIME) | C5020 | wt11 | Req11 | SumA1 |
| | | | C4920 | wt12 | | |
| | | | ... | ... | ... | |
| | | | ... | ... | ... | |
| B BUSINESS OPERATOR | ... | D002 (FIRST TIME) | C0530 | wt21 | Req21 | SumB1 |
| | | | C0529 | wt22 | | |
| | | | ... | ... | ... | |
| | | | ... | ... | ... | |
| C BUSINESS OPERATOR | ... | D003 (SECOND TIME) | C3030 | wt31 | Req31 | SumC1 |
| | | | C3029 | wt32 | | |
| | | | ... | ... | ... | |
| | | | ... | ... | ... | |

FIG. 15

INFORMATION PROCESSING APPARATUS

TECHNICAL FIELD

The present invention relates to a technique for allocating flight airspace to an aircraft.

BACKGROUND ART

Techniques for allocating flight airspace to an aircraft are known. For example, JP-2017-62724A discloses a technique that provides an air route along which an unmanned aircraft flies, the air route being located in a space higher than the tops of electrical wire poles with respect to the vertical direction and having a cross-sectional shape defined by a width determined on the basis of the shapes of the electrical wire poles.

SUMMARY OF INVENTION

It is assumed that as the use of drones becomes more common, management work of allocating flight airspace in response to requests from business operators will become necessary. In such a case, if much airspace is allocated to only some business operators, the competitiveness of business operators to which less airspace has been allocated will be reduced, thereby promoting oligopoly, so it is desirable to consider distributing the allocation of airspace among business operators.

Accordingly, an object of the present invention is to suppress bias in allocation of flight airspace to some business operators.

To achieve the above-described object, the present invention provides an information processing apparatus including: an accumulation unit that accumulates allocation results of each of business operators requesting allocation of flight airspace for an aircraft; and an allocation unit that, when allocation requests are received from multiple of the business operators, allocates flight airspace by giving priority to a high priority business operator according to the allocation results accumulated with respect to each business operator.

Also, a configuration may be adopted in which the accumulation unit accumulates, as the allocation results, an airspace amount represented by at least one of a size of the flight airspace and a period in which flight in the flight airspace is permitted, the airspace amount being an allocated airspace amount with respect to flight airspace for which allocation has been finalized, and the allocation unit allocates the flight airspace by assigning a higher priority to a business operator for which the allocated airspace amount that has been accumulated is small.

Furthermore, the allocation unit may determine the priority by adding, to the allocated airspace amount that has been accumulated, a requested airspace amount that is the airspace amount of the flight airspace requested by the received allocation requests.

Also, a configuration may be adopted in which an attribute is defined for airspace, and the allocation unit determines the priority by assigning a weight corresponding to the attribute of the flight airspace to the airspace amount of the flight airspace used when determining the priority.

Furthermore, the attribute may be a speed limit in the flight airspace.

Also, a configuration may be adopted in which the accumulation unit accumulates, as the allocation results, a number of aircraft that simultaneously use flight airspace, with respect to flight airspace for which allocation has been finalized, and the allocation unit determines the priority by assigning a weight corresponding to the number of aircraft in the flight airspace to the airspace amount of the flight airspace used when determining the priority.

Furthermore, a configuration may be adopted in which a time zone in which the aircraft is allowed to fly is represented in the allocation request, the accumulation unit accumulates, as the allocation results, an amount of allocation requests performed in order to allow aircraft to fly in the same time zone as the aircraft to which flight airspace has been allocated, with respect to flight airspace for which allocation has been finalized, and the allocation unit determines the priority by assigning a weight corresponding to the amount of allocation requests of each business operator to the airspace amount of the flight airspace of each business operator used when determining the priority.

Furthermore, a configuration may be adopted in which the information processing apparatus includes an obtainment unit that obtains information indicating a degree of performance of aircraft owned by each business operator, and the allocation unit determines the priority by assigning a weight corresponding to the degree of performance indicated by the obtained information to the airspace amount of the flight airspace used when determining the priority.

Also, the allocation unit may perform allocation without using the priority when the number of aircraft for which allocation was requested is less than a number of aircraft defined according to the size of airspace that can be allocated.

Advantageous Effects of Invention

According to the present invention, it is possible to suppress bias in allocation of flight airspace to some business operators.

BRIEF DESCRIPTION OF DRAWINGS

FIG. 2 is a diagram illustrating the hardware configuration of a server apparatus and the like.

FIG. 5 is a diagram illustrating an example of flight schedule information.

FIG. 10 is a diagram illustrating an example of tentative determination information.

FIG. 13 is a diagram illustrating an example of allocation results according to a variation.

FIG. 14 is a diagram illustrating an example of allocation results according to a variation.

FIG. 15 is a diagram illustrating an example of allocation results according to a variation.

DETAILED DESCRIPTION

1. Embodiment

Figure 1:
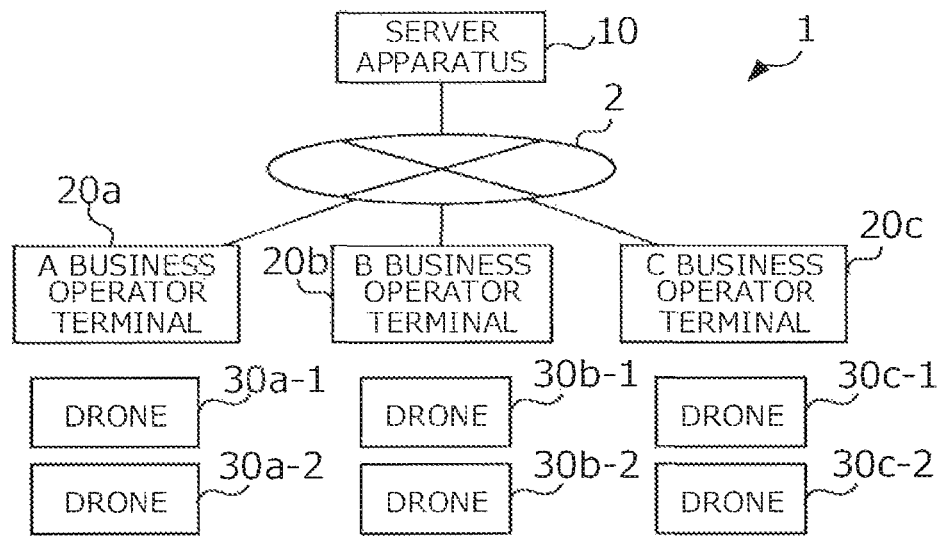
FIG. 1 is a diagram illustrating the overall configuration of a drone operation management system according to an embodiment.

FIG. 1 is a diagram illustrating the overall configuration of drone operation management system 1 according to an embodiment. Drone operation management system 1 is a system that manages operations of a drone. "Operation management" refers to managing flight of an aircraft such as a drone on the basis of a flight plan. In, for example, an environment in which multiple drones are flying, drone operation management system 1 supports the safe and smooth flight of the drones by allocating flight airspace to the drones.

A "drone" is an aircraft that is capable of flying in accordance with a flight plan and that is typically unmanned, and is an example of an "aircraft" according to the present invention. Drones are mainly used by companies operating transport, filming, and surveillance businesses, for example. Although the present embodiment describes unmanned drones as the subject of the operation management, manned drones also exist, and manned drones may therefore also be subject to the operation management. Regardless of whether or not drone operation management system 1 handles manned aircraft, a scope of management for carrying out control in which the flight airspace of manned craft such as airplanes is ascertained and flight instructions or the like are issued may be included in the operation management carried out by drone operation management system 1.

Drone operation management system 1 includes network 2, server apparatus 10, A business operator terminal 20a, B business operator terminal 20b, C business operator terminal 20c (called "business terminals 20" when there is no need to distinguish between them), drones 30a-1 and 30a-2 of A business operator, drones 30b-1 and 30b-2 of B business operator, and drones 30c-1 and 30c-2 of C business operator (called "drones 30" when there is no need to distinguish between them).

Network 2 is a communication system including a mobile communication network, the Internet, and the like, and relays the exchange of data between devices accessing that system. Network 2 is accessed by server apparatus 10 and business operator terminals 20 through wired communication (or wireless communication). Business operator terminals 20 are, for example, terminals used by a person in charge of operation management of drones 30 in the respective businesses to operate and manage respective drones 30.

Business operator terminals 20 generates a flight schedule indicating the flight outline scheduled by drone 30 by operation of the operation manager, and transmits the generated flight schedule to sever apparatus 10. Server apparatus 10 is an information processing device that performs processing relating to the assignment of flight airspace of drone 30. Server apparatus 10 allocates flight airspace to drone 30 on the basis of the received flight schedule.

To be more specific, "allocating flight airspace" means allocating both flight airspace and a flight permission period. Flight airspace is information indicating a space through which drone 30 is to pass when flying from a departure point to a destination, and the flight permission period is information indicating a period for which flight is permitted in the allocated flight airspace. Server apparatus 10 creates allocation information indicating the allocated flight airspace and the flight permission period, and transmits the created allocation information to business operator terminal 20.

Business operator terminal 20 generates flight control information, which is an information set by which drone 30 controls its own flight, on the basis of the received allocation information, and transmits the generated flight control information to the target drone 30. Although the information used by drone 30 to control the flight differs depending on the specifications of the program that controls drone 30, flight altitude, flight direction, flight speed, spatial coordinates of the point of arrival, and the like are used, for example.

Drone 30 is an aircraft that flies autonomously or according to a flight plan (a flight plan according to the allocated flight airspace and flight permission period), and in the present embodiment, is a rotary-wing aircraft that includes one or more rotors and flies by rotating those rotors. All drones 30 include a coordinate measurement function for measuring the position and altitude of that drone 30 (i.e., spatial coordinates in a three-dimensional space) and a time measurement function for measuring time, and can fly within the flight airspace and flight permission period indicated by the allocation information by controlling the flight speed and flight direction while measuring the spatial coordinates and the time.

Figure 2:
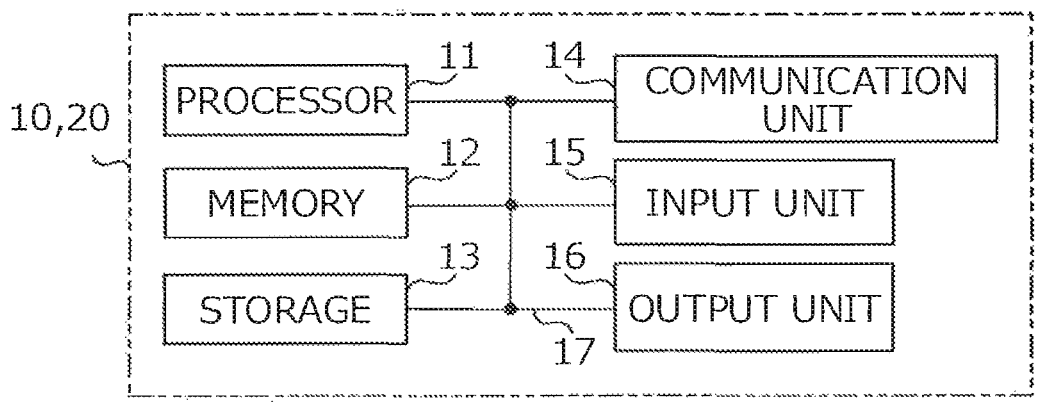

FIG. 2 is a diagram illustrating the hardware configuration of server apparatus 10 and the like. Server apparatus 10 and the like (server apparatus 10 and business operator terminal 20) are both computers that include the following apparatuses, namely processor 11, memory 12, storage 13, communication unit 14, input unit 15, output unit 16, and bus 17. The term "apparatus" used here can be replaced with "circuit", "device", "unit", or the like. One or more of each apparatus may be included, and some apparatuses may be omitted.

Processor 11 controls the computer as a whole by running an operating system, for example. Processor 11 may be constituted by a central processing unit (CPU) including an interface with peripheral apparatuses, a control apparatus, a computation apparatus, registers, and the like. Additionally, processor 11 reads out programs (program code), software modules, data, and the like from storage 13 and/or communication unit 14 into memory 12, and then executes various types of processes in accordance therewith.

There may be one, or two or more, processors 11 that execute the various types of processes, and two or more processors 11 may execute various types of processes simultaneously or sequentially. Processor 11 may be provided as one or more chips. The programs may be transmitted from a network over an electrical communication line.

Memory 12 is a computer-readable recording medium, and may be constituted by at least one of ROM (Read Only Memory), EPROM (Erasable Programmable ROM), EEPROM (Electrically Erasable Programmable ROM), RAM (Random Access Memory), and so on, for example. Memory 12 may be called a "register", "cache", "main memory" (a main storage apparatus), or the like. Memory 12 can store the aforementioned programs (program code), software modules, data, and the like.

Storage 13 is a computer-readable recording medium, and may be constituted by at least one of an optical disk such as a CD-ROM (Compact Disc ROM), a hard disk drive, a flexible disk, a magneto-optical disk (e.g., a compact disk, a digital versatile disk, or a Blu-ray (registered trademark)

disk), a smartcard, flash memory (e.g., a card, a stick, or a key drive), a Floppy (registered trademark) disk, a magnetic strip, and the like.

Storage 13 may be called an auxiliary storage apparatus. The aforementioned storage medium may be a database, a server, or another appropriate medium including memory 12 and/or storage 13, for example. Communication unit 14 is hardware for communicating between computers over a wired and/or wireless network (a transmission/reception device), and is also called a network device, a network controller, a network card, a communication module, and the like, for example.

Input unit 15 is an input device that accepts inputs from the exterior (e.g., a keyboard, a mouse, a microphone, a switch, a button, a sensor, or the like). Output unit 16 is an output device that makes outputs to the exterior (e.g., a display, a speaker, or the like). Note that input unit 15 and output unit 16 may be configured integrally (e.g., a touchscreen). The apparatuses such as processor 11 and memory 12 can access each other over bus 17, which is used for communicating information. Bus 17 may be constituted by a single bus, or may be constituted by buses that differ among the apparatuses.

Figure 3:
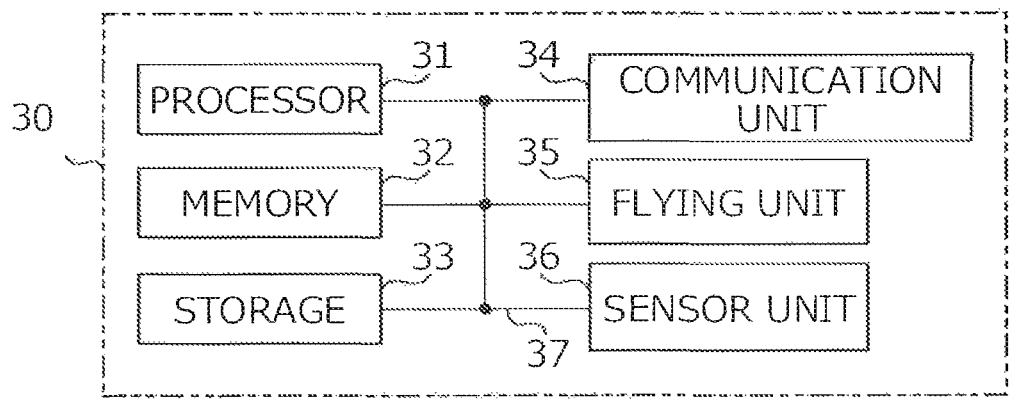
FIG. 3 is a diagram illustrating the hardware configuration of a drone.

FIG. 3 illustrates the hardware configuration of drone 30. Drone 30 is a computer including the following apparatuses, namely processor 31, memory 32, storage 33, communication unit 34, flying unit 35, sensor unit 36, and bus 37. The term "apparatus" used here can be replaced with "circuit", "device", "unit", or the like. One or more of each apparatus may be included, and some apparatuses may be omitted.

Processor 31, memory 32, storage 33, and bus 37 are the same as the hardware of the same names illustrated in FIG. 2. Communication unit 34 can not only communicate wirelessly with the network 2, but can also implement wireless communication between drones 30. Flying unit 35 includes the aforementioned rotors and driving means such as a motor for rotating the rotors, and is an apparatus for causing the host device (drone 30) to fly.

Flying unit 35 can move the host device in all directions, stop the host device (hovering), and the like while in the air. Sensor unit 36 is an apparatus including a sensor group that obtains information necessary for flight control. Sensor unit 36 includes a position sensor that measures the position (latitude and longitude) of the host device, a direction sensor that measures the direction the host device is facing (a forward direction is defined for drone 30, and the forward direction is the direction the host device is facing), and an altitude sensor that measures the altitude of the host device.

Note that server apparatus 10, drones 30, and so on may be configured including hardware such as microprocessors, DSPs (Digital Signal Processors), ASICs (Application Specific Integrated Circuits), PLDs (Programmable Logic Devices), FPGA (Field Programmable Gate Arrays), and the like, and some or all of the function blocks may be realized by that hardware. For example, processor 11 may be provided as at least one of these types of hardware.

Server apparatus 10, business operator terminals 20, and drones 30 included in drone operation management system 1 store programs provided by the system, and implement the following group of functions by the processors included in the devices executing programs and controlling the various units.

Figure 4:
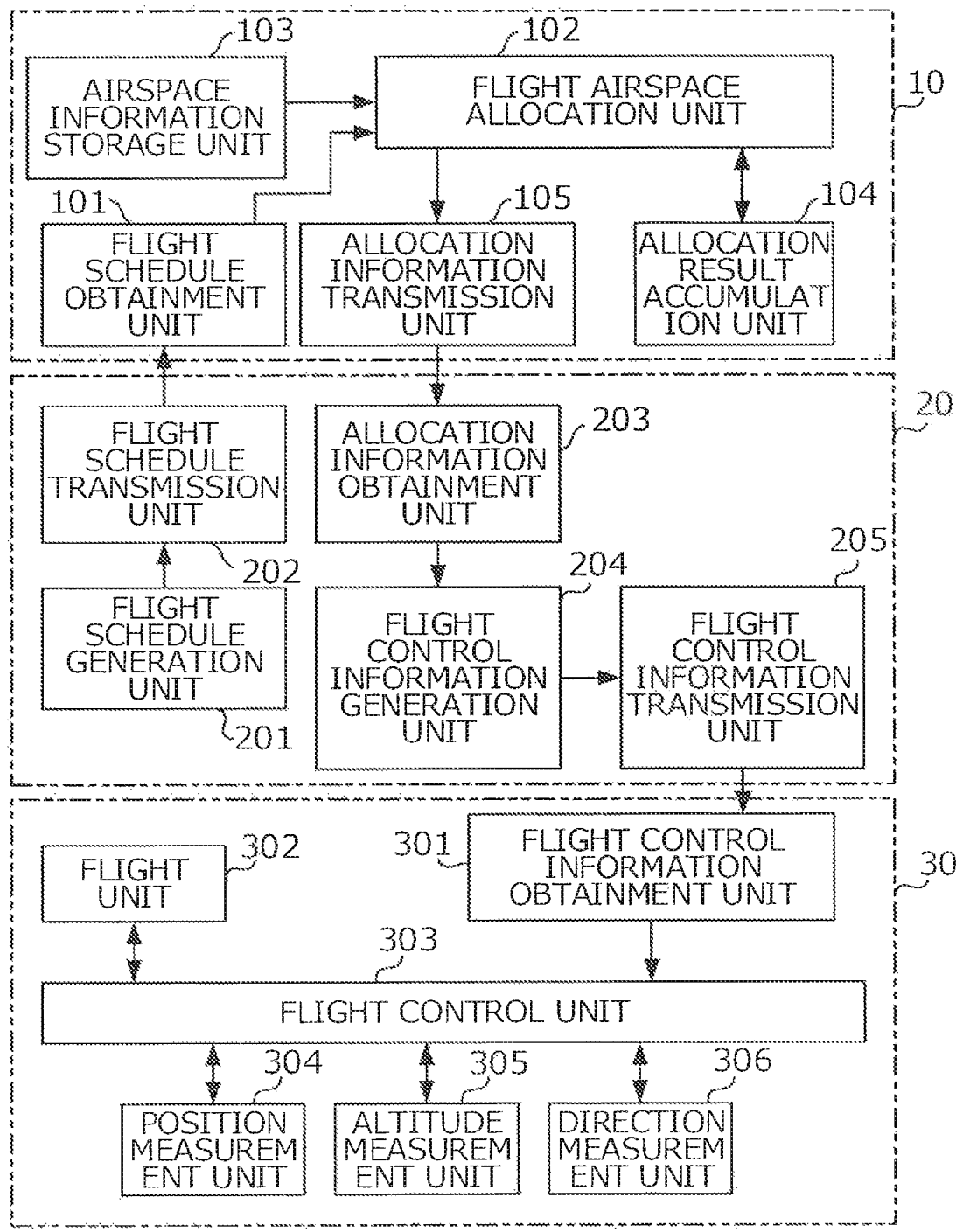
FIG. 4 is a diagram illustrating a functional configuration realized by the drone operation management system.

FIG. 4 illustrates a functional configuration realized by drone operation management system 1. Although only one each of business operator terminals 20 and drones 30 are illustrated in FIG. 4, the multiple business operator terminals 20 and multiple drones 30 all have the same functional configuration.

Server apparatus 10 includes flight schedule obtainment unit 101, flight airspace allocation unit 102, airspace information storage unit 103, allocation result accumulation unit 104, and allocation information transmission unit 105. Business operator terminal 20 includes flight schedule generation unit 201, flight schedule transmission unit 202, allocation information obtainment unit 203, flight control information generation unit 204, and flight control information transmission unit 205. Drone 30 includes flight control information obtainment unit 301, flight unit 302, flight control unit 303, position measurement unit 304, altitude measurement unit 305, and direction measurement unit 306.

Flight schedule generation unit 201 of business operator terminal 20 generates the flight schedule information, which indicates the flight schedule of drone 30. Flight schedule generation unit 201 generates the flight schedule information on the basis of input information, upon the aforementioned operation manager inputting, to business operator terminal 20, a drone ID (identification) identifying drone 30 for which the flight schedule is to be input, names of the departure point, waypoint, and destination, and estimated departure time and estimated arrival time, for example. Note that the flight schedule information is merely information indicating a flight schedule desired or requested by the business operator, and does not indicate a finalized flight plan.

FIG. 5 illustrates an example of flight schedule information. In the example of FIG. 5, "warehouse α1", "intersection β1", "store γ1", "T1", and "T2", which correspond to the departure point, waypoint, destination, estimated departure time, and estimated arrival time, respectively, are associated with a drone ID of "D001", which identifies drone 30a-1 illustrated in FIG. 1. Also, "port α2", "intersection β2", "building γ2", "T3", and "T4", which correspond to the departure point, waypoint, destination, estimated departure time and estimated arrival time, respectively, are associated with a drone ID of "D002", which identifies drone 30b-1. Note that this flight schedule information is merely an example, and there may be cases where, for example, a waypoint, an estimated departure time, or the like are not included.

It is assumed that times such as "T1" actually express times in one-minute units, such as "9 hours 00 minutes". Note, however, that the time may be expressed at a finer level (e.g., in units of seconds), or at a broader level (e.g., in units of five minutes). Furthermore, although the date of the flight schedule may also be input, the present embodiment assumes that the operation manager inputs the flight schedule for that day on the morning of that day (i.e., that the date is unnecessary), to simplify the descriptions.

The flight schedule information of drone 30 is generated by flight schedule generation unit 201 of business operator terminal 20 of the business operator that operates drone 30. Flight schedule generation unit 201 supplies the generated flight schedule information to flight schedule transmission unit 202. Flight schedule transmission unit 202 transmits the supplied flight schedule information to server apparatus 10. By transmitting the flight schedule information of drone 30, a request to allocate flight airspace (specifically, flight airspace and a flight permission period) to that drone 30 is made.

Flight schedule obtainment unit 101 of server apparatus 10 obtains the flight schedule information transmitted from each business operator terminal 20 as flight airspace allocation requests. Flight schedule obtainment unit 101 supplies the obtained flight schedule information to flight airspace allocation unit 102. Flight airspace allocation unit 102 allocates the flight airspace requested for that drone 30 on the basis of the flight schedule information of drone 30 that was supplied. Flight airspace allocation unit 102 is an example of an "allocation unit" of the present invention.

Allocation of flight airspace means allocation of both flight airspace in which drone 30 should fly (space through which the drone 30 should travel when flying from the departure point to the destination) and a flight permission period (a period in which flight through the flight airspace is permitted). Flight airspace allocation unit 102 allocates flight airspace on the basis of allocation results accumulated in allocation result accumulation unit 104 described later. However, the allocation method cannot be carried out if allocation results have not been accumulated, so first, a case will be described where flight airspace is allocated by a method used in a period where allocation results are not accumulated (a method in which allocation results are not used).

In drone operation management system 1, permitted flight airspace through which drones 30 can fly are determined in advance, in the same manner as a network of roads. The permitted flight airspace is of course airspace for which permission necessary for flight has been obtained, and may sometimes contain airspace for which permission is not needed. In the present embodiment, the permitted flight airspace is expressed as cubic spaces laid out without gaps therebetween (called "cells" hereinafter), and each cell is assigned a cell ID for identifying that cell.

Airspace information storage unit 103 stores airspace information related to each airspace included in airspace where flight is permitted.

Figures 6, 7:
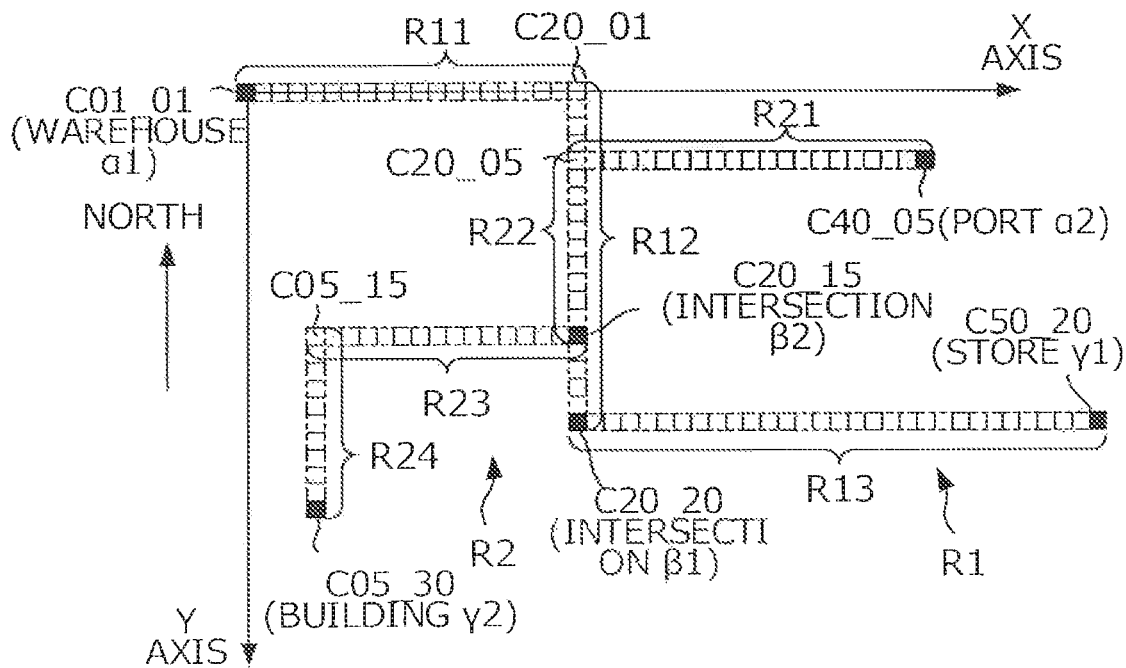
FIG. 6 is a diagram illustrating an example of airspace information.
FIG. 7 is a diagram illustrating an example of tentatively-determined flight airspace.

FIG. 6 illustrates an example of the airspace information. In the example of FIG. 6, airspace information storage unit 103 stores airspace information in which cell IDs representing each airspace, coordinates of the center of each cell, and airspace attributes of each cell are associated. In this airspace information, cell IDs "C01_01", "C02_01", and so on up to "C99_99" are associated with center coordinates "x1, y1, z1", "x2, y1, z1", and so on up to "x99, y99, z99", respectively.

In the present embodiment, to simplify the descriptions, the cells have a constant altitude, and the xy coordinates of each cell are indicated as being associated with the cell ID (e.g., the cell having xy coordinates of (x10, y15) is given a cell ID of C10_15). In the example of FIG. 6, the lengths of the sides of each cell are all "L1".

The airspace attributes are information representing properties unique to each cell, and in FIG. 6, length of one side of a cell which is a cube, flight permission, sharing permission, and speed limit are represented. In the example of FIG. 6, the length of one side of each cell is expressed as "L1". Further, FIG. 6 shows that cells C01_01 and C02_01 and the like are permitted for flight ("Yes"), and cells C98_99 and C99_99 and the like are not permitted for flight ("No"). For example, airspace above important facilities, places where people pass, and the like is defined as airspace where flight is not permitted.

Cell sharing means that the same cells are allocated to multiple drones 30 in the same period (that is, the flight permission periods in those cells are caused to overlap), and those cells are exclusively allocated when sharing is not permitted (that is, the flight permission periods in those cells are not caused to overlap). Overlapping of the flight permission periods also includes a case where only some of the flight permission periods overlap. Also, in a case where multiple cells for which flight is permitted are to be shared in a manner connected in series and continuous, causing the flight permission periods to overlap across all of those multiple cells is referred to as cell sharing.

For example, when ten cells arranged in a line are shared by multiple drones 30, those multiple drones 30 may fly simultaneously in the same single cell, or may fly simultaneously in different cells among the ten cells. Note that, even if cells are shared, the flight permission period has a width, so depending on the flight timing of each drone 30, it may happen that drones 30 do not fly in the shared cells simultaneously. In other words, sharing cells means allowing simultaneous flight in the shared cells. On the other hand, if a cell (including multiple cells) is not shared, it is impossible for multiple drones 30 to fly in that cell simultaneously (except when an unexpected situation occurs).

In the example of FIG. 6, cells C01_01 and C02_01 and the like are shareable ("Yes"), and cells C20_20 and C21_20 and the like are not shareable ("No"). The speed limit is the maximum speed permitted when flying in the cell, and speed limit Slmt1 is defined for cells C01_01 and C02_01 and the like, and speed limit Slmt2 is defined for cells C20_20 and C21_20 and the like. Note that airspace attributes such as sharing permission are not applicable for cells where flight is not permitted, so they are not defined in those cells.

Flight airspace allocation unit 102 specifies, from the cells in the "flight permitted" attribute, the cell that is closest to the departure point included in the flight schedule (a departure point cell) and the cell that is closest to the destination (a destination cell). For example, flight airspace allocation unit 102 tentatively determines a flight airspace that reaches from the specified departure point cell through cells of the "flight permitted" attribute to the destination cell, and has the shortest flight distance. At that time, flight airspace allocation unit 102 may, for example, tentatively determine the flight airspace by first selecting a cell of a "shareable" attribute, but in a case where the destination cell is not reached with only a cell of the "shareable" attribute, or in a case where stable flight or high-speed flight becomes possible by allocating a cell of a "not sharable" attribute, the cell of the "not sharable" attribute is selected to tentatively determine the flight airspace.

Also, when there are multiple flight airspaces that can be tentatively determined by the above method, a flight airspace with the least number of directional changes or a flight airspace randomly selected from among the multiple airspaces is tentatively determined. Note that when selecting a cell having the "not shareable" attribute, even if the cell has already been tentatively determined as the flight airspace of another drone 30, flight airspace allocation unit 102 later determines which cell to officially allocate, so here, flight airspace including that cell is tentatively determined as-is.

FIG. 7 illustrates an example of the tentatively-determined flight airspace. FIG. 7 illustrates an x axis and a y axis that take the center of cell C01_01 (the cell with a cell ID of C01_01) as the origin, with the direction of the arrow on the x axis called the x axis positive direction, the direction opposite thereto called the x axis negative direction, the direction of the arrow on the y axis called the y axis positive direction, the direction opposite thereto called the y axis negative direction, and the y axis negative direction assumed to be north. The example of FIG. 7 illustrates flight airspace R1 spanning from "warehouse α1" to "store γ1" through "intersection β1" included in the flight schedule illustrated in FIG. 5.

Flight airspace R1 includes: divided airspace (airspace obtained by dividing the flight airspace) R11 from cell C01_01, which is the departure point cell, through the cells adjacent in the x axis positive direction, and to cell C20_01; divided airspace R12 from cell C20_01, through the adjacent cells in the y axis positive direction, and to cell C20_20 which is a waypoint cell; and divided airspace R13 from cell C20_20, through the adjacent cells in the x axis positive direction, and to cell C50_20, which is the destination cell.

Additionally, the example of FIG. 7 illustrates flight airspace R2 spanning from "port α2" through "intersection β2" to "building γ2" included in the flight schedule illustrated in FIG. 5. Flight airspace R2 includes: divided airspace R21 from cell C40_05, which is the departure point cell, through the cells adjacent in the x axis negative direction, and to cell C20_05; divided airspace R22 from cell C20_05, through the adjacent cells in the y axis positive direction, and to cell C20_15 which is a waypoint cell; divided airspace R23 from cell C20_15, through the adjacent cells in the x axis negative direction, and to cell C05_15; and divided airspace R24 from cell C05_15, through the adjacent cells in the y axis positive direction, and to cell C05_30, which is the destination cell.

In the present embodiment, flight airspace allocation unit 102 tentatively determines the flight permission period for each divided airspace. For example, flight airspace allocation unit 102 calculates a period obtained by dividing a period, from the estimated departure time to the estimated arrival time included in the flight schedule, according to a ratio on the basis of the length of each divided airspace, as an airspace passage period required when passing through each divided airspace.

For example, if the ratio of the lengths of divided airspaces R11, R12, and R13 in flight airspace R1 is 2:2:3, and the period from the estimated departure time to the estimated arrival time is 70 minutes, flight airspace allocation unit 102 calculates 20 minutes:20 minutes:30 minutes as the airspace passage period for the divided airspaces. Flight airspace allocation unit 102 tentatively determines, as the flight permission period in each divided airspace, a period that takes, as a start time or an end time, a time to which a margin period is added before and after times after which the airspace passage periods have passed in sequence following the estimated departure time (i.e., a time after the passage of 20 minutes, a time after the passage of 40 minutes, and a time after the passage of 70 minutes).

Figures 8, 9:
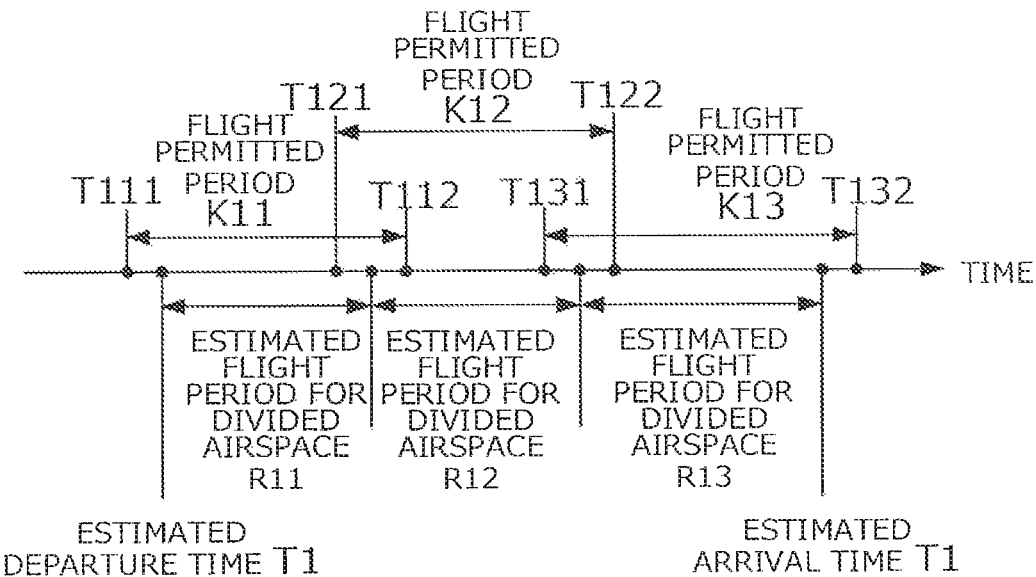
FIG. 8 is a diagram illustrating an example of flight permission periods.
FIG. 9 is a diagram illustrating another example of flight airspace.

FIG. 8 illustrates an example of flight permission periods. With respect to divided airspace R11, assuming the margin period is three minutes, for example, flight airspace allocation unit 102 tentatively determines, as the flight permission period, period K11, which takes three minutes before estimated departure time T11 as start time T111, and takes a time when the margin period of three minutes has passed following the passage of the airspace passage period (20 minutes) for divided airspace R11 from estimated departure time T11 (i.e., 23 minutes after estimated departure time T1) as end time T112.

With respect to divided airspace R12, flight airspace allocation unit 102 tentatively determines, as the flight permission period, period K12, which takes a time that is the margin period of three minutes before a time at which 20 minutes, which is the airspace passage period of divided airspace R11, has passed following estimated departure time T11 (i.e., 17 minutes after estimated departure time T1), as start time T121, and which takes a time at which the margin period of three minutes has passed after the passage of 40 minutes corresponding to the airspace passage periods in both divided airspaces R11 and R12 from estimated departure time T11 (i.e., 43 minutes after estimated departure time T1) as end time T122.

With respect to divided airspace R13, flight airspace allocation unit 102 tentatively determines, as the flight permission period, period K13, which takes a time that is the margin period of three minutes before a time at which the 40 minutes corresponding to the airspace passage periods of both divided airspaces R11 and R12 have passed after estimated departure time T11 (i.e., 37 minutes after estimated departure time T1) as start time T131, and which takes a time at which the margin period of three minutes has passed after the passage of 70 minutes corresponding to the airspace passage periods of divided airspaces R11, R12, and R13 from estimated departure time T11 (i.e., 73 minutes after estimated departure time T1 or three minutes after estimated arrival time T2) as end time T132.

Flight airspace allocation unit 102 temporarily stores the information tentatively determined in this manner (tentative determination information).

FIG. 9 illustrates an example of the tentative determination information. In FIG. 9, the cell IDs of the cells included in the flight airspace are collected for each divided airspace, the corresponding flight permission periods are associated with each divided airspace, and the flight airspaces and flight permission periods are associated with the drone IDs of the tentatively-determined drone 30. For example, a cell ID group of the cells included in divided airspaces R11, R12, and R13, and the start times and end times of periods K11, K12, and K13, which are the flight permission periods, are associated with the drone ID "D001" indicating the drone 30a-1.

A cell ID group of the cells included in divided airspaces R21 to R24, and flight permission periods K21 to K24, are respectively associated with the drone ID "D002" indicating drone 30b-2. As described above, even if flight airspace overlaps at the tentative determination stage (even if cells having the "not sharable" attribute overlap each other), flight airspace allocation unit 102 allocates all the flight airspace as-is, and it is therefore determined whether or not to allocate the flight airspace in an overlapping state, i.e., whether or not to share the flight airspace. Flight airspace allocation unit 102 determines whether or not overlapping flight airspace allocated in this manner (overlapping airspace (also referred to as overlapping cells)) is to be shared.

Accordingly, first, flight airspace allocation unit 102 extracts combinations of drones 30 for which the tentatively-determined flight airspace overlaps. Flight airspace allocation unit 102 calculates, for each drone 30, a period (expected flight period) in which it is expected to fly through each cell of the allocated flight space. Flight airspace allocation unit 102 calculates an average speed obtained by dividing the distance of the flight path indicated by the flight airspace by the time from the estimated departure time to the estimated arrival time, and calculates, as the expected flight period, a period in which drone 30 will fly through each cell when drone 30 flies at the average speed.

In the present embodiment, if there are overlapping cells that have been tentatively determined to be allocated to two or more drones 30, and the difference between estimated flight periods (the difference between flight start times of the respective cells, or the difference between flight end times of the respective cells) for the overlapping cells is less than a threshold, flight airspace allocation unit 102 extracts the combination of those drones 30 as a combination of drones 30 for which the flight airspace overlaps. Flight airspace allocation unit 102 naturally determines that the overlapping airspace is not to be shared when the attribute of the overlapping cells is "not sharable".

Also, when cells of the "shareable" attribute are overlapping cells, for example, when the extracted drones 30 fly in the same direction as each other, flight airspace allocation unit 102 determines that overlapping airspace (airspace represented by overlapping cells) is to be shared, and when the extracted drones 30 fly in different directions, flight airspace allocation unit 102 determines that overlapping airspace is not to be shared. When overlapping airspace is to be shared, flight airspace allocation unit 102 determines to officially allocate that overlapping airspace as-is to the multiple extracted drones 30.

Also, when not sharing overlapping airspace, flight airspace allocation unit 102 officially allocates overlapping airspace to drone 30 having a high priority. At the stage where allocation results have not been accumulated, flight airspace allocation unit 102 determines that drone 30 having the earliest estimated flight period in an overlapping cell has high priority (comparing the earliest estimated flight periods when multiple cells are overlapping), and determines to officially allocate overlapping airspace as-is to that drone 30.

Regarding drone 30 for which overlapping airspace has been allocated, flight airspace allocation unit 102 withdraws the allocation of the tentatively-determined flight airspace, and instead allocates different flight airspace (also tentatively-determined), i.e., revises the flight airspace to be allocated. At this time, flight airspace allocation unit 102 allocates the new flight airspace from airspace aside from airspace for which the official allocation has been finalized. In this manner, flight airspace allocation unit 102 allocates flight airspace for all drones 30 that requested allocation by repeating the tentative determination, revision, and finalization of the allocation.

However, because airspace is limited, if the number of drones 30 requesting airspace allocation is too high, a situation in which flight airspace cannot be allocated to some drones 30 may arise. In such a case, flight airspace allocation unit 102 includes information, which associates the drone ID of drone 30 for which it has been determined that airspace cannot be allocated with an indication that the allocation is not possible, in the allocation information so as to notify business operator terminal 20 that the allocation was not carried out.

For that drone 30, the aforementioned operation manager inputs a new flight schedule and requests the allocation of flight airspace again, for example. Note that a configuration may also be adopted in which, when an allocation request is made, by the operation manager inputting in advance a second desired flight schedule, it is considered that an allocation was requested again with that second desired flight schedule, and flight airspace allocation unit 102 again performs allocation (input of third and subsequent desired flight schedules is likewise possible). Also, even when allocation of flight airspace is not requested again, flight airspace allocation unit 102 may allocate, as the flight airspace of drone 30 for which flight airspace has not been allocated, a flight airspace that has the smallest deviation from the estimated flight time and can be allocated.

When finalizing the flight airspace allocation for all drones 30 according to the method described above, flight airspace allocation unit 102 generates tentative determination information at the time of finalizing as allocation information indicating the official allocation of the flight airspace and the flight permission period. Flight airspace allocation unit 102 supplies the generated allocation information to allocation result accumulation unit 104. Allocation result accumulation unit 104 accumulates allocation results (results regarding finalized allocations) for each business operator (in the present embodiment, A business operator, B business operator, and C business operator) that requests an allocation of flight airspace for drone 30. Allocation result accumulation unit 104 is an example of an "accumulation unit" in the present invention.

FIG. 10 shows an example of allocation results. In the example of FIG. 10, allocation result accumulation unit 104 accumulates, associated with each business operator, an allocation date (the date of allocation), information identifying each allocation request (in the example of FIG. 10, a drone ID of drone 30 that received the allocation and a number of requests on that day for that drone 30), a cell ID of the allocated cell allocated by the allocation request, an allocation period allocated as a period in which the drone should fly in each allocated cell, and an allocated airspace amount.

The allocation period is a period allocated as a period in which the drone 30 should fly, and is a period (for example, represented as 1 minute per cell) representing the length of the estimated flight period described above. The airspace amount is information indicating the amount of flight airspace in which drone 30 flies, and is represented by at least one of the size (spatial amount) of the flight airspace and the length of time during which flight in the flight airspace is permitted (amount of time). In the present embodiment, the airspace amount is represented by both the size of the flight airspace and the length of time during which flight in the flight airspace is permitted. The allocated airspace amount is the airspace amount of the flight airspace for which allocation has been finalized by flight airspace allocation unit 102, that is, the allocated airspace amount.

In the present embodiment, allocation result accumulation unit 104 calculates the allocated airspace amount as follows. Allocation result accumulation unit 104, in the allocation periods stored for each business operator, multiplies a value representing the size of the allocated cell associated with the allocation period (in the present embodiment, each value being cell volume Vol1 ($=L1^3$)), and calculates the sum. For example, in the case of A business operator, allocation periods wt11, wt12, . . . , are accumulated, so the allocated airspace amount is calculated by the formula Vol1×wt11+ Vol1×wt12+ . . . =SumA1.

In the example of FIG. 10, allocation result accumulation unit 104 accumulates SumA1, SumB1, and SumC1 (SumB1<SumC1<SumA1) respectively as the allocated airspace amounts of A business operator, B business operator, and C business operator in the past one year. Note that the period of one year is an example, and may be shorter or longer than this. Moreover, all the past allocation results may be accumulated without setting a period. Further, although both of the allocated cells and the allocated periods are accumulated in the example of FIG. 10, a configuration may also be adopted in which only one among these is stored.

Allocation result accumulation unit 104, when only allocated cells have been accumulated, may calculate as the allocated airspace amount a value obtained by adding cell volume Vol1 to the number of allocated cells, and when only allocation periods have been accumulated, may calculate a value obtained by summing the accumulated allocation periods as the allocated airspace amount. In other words, allocation result accumulation unit 104 may accumulate allocated airspace amounts expressed by at least one of the size of the allocated flight airspace (represented by cell volume Vol1 in the example of FIG. 10) and the period during which flight in the flight airspace is permitted (expressed by the allocation periods in the example of FIG. 10) as the allocation results.

In the present embodiment, allocation result accumulation unit 104 accumulates the allocated airspace amounts represented by both the size of the allocated flight airspace and the period during which flight in the flight airspace is permitted as the allocation results. The allocation results thus accumulated are used for allocation of flight airspace on the basis of the allocation results described above (details will be described later). Flight airspace allocation unit 102 supplies the generated allocation information to allocation information transmission unit 105 together with the speed limit information in which the speed limits in the airspace information shown in FIG. 6 are associated with cell IDs. Allocation information transmission unit 105 transmits the allocation information and the speed limit information supplied from flight airspace allocation unit 102 to business operator terminal 20 used by the operation manager of drone 30 of the drone ID included in that allocation information.

Allocation information obtainment unit 203 of business operator terminal 20 obtains allocation information and speed limit information that has been transmitted and supplies that information to flight control information generation unit 204. Flight control information generation unit 204 generates the above-described flight control information (a group of information for drone 30 to control its own flight).

Figure 11:
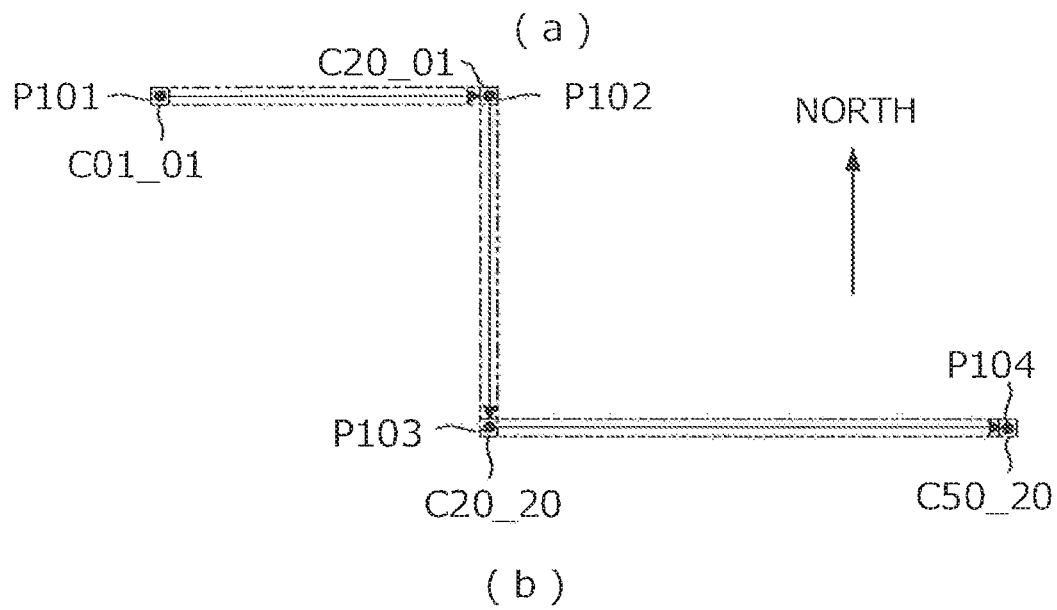
FIG. 11 is a diagram illustrating an example of flight control information.

FIG. 11 illustrates an example of flight control information. FIG. 11 illustrates the flight control information for the above-described drone 30a-1.

As illustrated in FIG. 11(a), flight airspace from cell C01_01, which is the departure point cell, turning at cell C20_01 and cell C20_20, and then arriving at cell C50_20, which is the destination cell, is allocated to drone 30a-1. First, flight control information generation unit 204 calculates coordinates P101, P102, P103, and P104 of the center points of these four cells as target point coordinates (coordinates of target points to be arrived at next), and generates the flight control information including those coordinates.

In drone operation management system 1, a drone port where drone 30 can land is prepared at the point designated as the destination, and business operator terminal 20 stores the coordinates of each drone port in association with the name of the destination. In the example of FIG. 11(b), flight control information generation unit 204 adds coordinates P105 of the drone port associated with "store γ1", which is the destination of drone 30a-1, to the flight control information as the target point coordinates.

Flight control information generation unit 204 adds, to the flight control information, the flight altitude, flight direction, flight speed, spatial width, and target arrival time when flying to each of the target point coordinates. As, for example, the flight altitude, flight control information generation unit 204 adds "0-A1" to the flight to coordinates P101 (takeoff); "A1", to the flight up to coordinates P104 following thereafter (horizontal flight); and "A1-0", to the flight up to coordinates P105 (landing).

Additionally, as the flight direction, flight control information generation unit 204 adds "facing east" from coordinates P101 to coordinates P102, "facing south" from coordinates P102 to coordinates P103, and "facing east" from coordinates P103 to coordinates P104, in which the horizontal flight is carried out. Furthermore, as the flight speed from P101 to P104, in which the horizontal flight is carried out, flight control information generation unit 204 adds an average speed V1 when flying in the flight airspace during a period from estimated departure time T1 to estimated arrival time T2 included in the flight schedule, for example. Note that when the speed limit information indicates a cell for which the average speed V1 exceeds the speed limit, flight control information generation unit 204 changes the speed in the cell to the speed limit (in the example of FIG. 11, a cell exceeding the speed limit is not included in the flight airspace).

Furthermore, flight control information generation unit 204 adds a length L1 of one side of the cell, as defined in the present embodiment, as the spatial width of the flight airspace from coordinates P101 to coordinates P104, in which the horizontal flight is carried out. The three spatial widths "L1, L1, L1" indicated in FIG. 11 refer to widths in three directions, namely the x axis direction, the y axis direction, and the z axis direction. The flight direction, flight speed, and spatial width are not needed during takeoff and landing and are therefore left blank.

Additionally, flight control information generation unit 204 adds a time using the estimated departure time T1 and estimated arrival time T2, and the start time and end time of the flight permission period, as the target arrival time for each of the target point coordinates. For example, as the target arrival time for coordinates P101, flight control information generation unit 204 defines time T111', which follows, by a predetermined amount of time, start time T111 of period K11, which is the flight permission period for divided airspace R11 starting from cell C01_01 that includes coordinates P101.

Entering cell C01_01 before start time T111 corresponds to entry prior to period K11, which is the flight permission period, and thus time T111' expresses a time that has passed following start time T111 by an amount of time longer than the amount of time required to arrive at coordinates P101 after entering cell C01_01. Arriving after time T111' corresponds to entering divided airspace R11 once in period K11, which is the flight permission period.

Additionally, as the target arrival time for coordinates P102, which correspond to the boundary between divided airspaces R11 and R12, flight control information generation unit 204 defines a time from time T121', which follows, by a predetermined amount of time, start time T121 of the flight permission period of divided airspace R12 starting from cell C20_01 that includes coordinates P102, to time T112', which precedes, by a predetermined amount of time, end time T112 of the flight permission period of divided airspace R11 that ends at cell C20_01.

Like time T111', arriving at coordinates P102 after time T121' corresponds to entering divided airspace R12 once in period K12, which is the flight permission period. It is assumed that time T112' expresses a time that has passed following end time T112 by an amount of time longer than the amount of time required to exit cell C20_01 from coordinates P102. Arriving at coordinates P102 before time T112' means that if the flight is continued, divided airspace R11 can be exited before period K11, which is the flight permission period, ends. The target arrival time at coordinates P103, which corresponds to the boundary between divided airspaces R12 and R13, is determined through the same method.

As the target arrival time at coordinates P104, flight control information generation unit 204 defines a time before time T132', which precedes, by a predetermined amount of time, end time T132 of period K13, which is the flight permission period of divided airspace R13 that ends at cell C50_20 including coordinates P104. Arriving at coordinates P104 before time T132' means that if the flight is continued, divided airspace R13 can be exited before period K13, which is the flight permission period, ends. Flight control information generation unit 204 supplies the flight control information generated in this manner to flight control information transmission unit 205.

Flight control information transmission unit 205 transmits the supplied flight control information to the target drone 30. Flight control information obtainment unit 301 of drone 30 obtains the flight control information that has been transmitted and supplies the obtained flight control information to flight control unit 303. Flight unit 302 is a function for causing the host device (that drone) to fly. In the present embodiment, flight unit 302 causes the host device to fly using the rotors, driving means, and so on included in flying unit 35.

Flight control unit 303 controls flight unit 302, and in the present embodiment, performs flight control processing to fly the host device according to the flight plan. Flight control unit 303 controls flight on the basis of the flight control information supplied from flight control information obtainment unit 301, thereby flying the host device according to the flight plan. Position measurement unit 304 measures the position of the host device, and supplies position information indicating the measured position (e.g., latitude/longitude information) to flight control unit 303.

Altitude measurement unit 305 measures the altitude of the host device, and supplies altitude information indicating the measured altitude (e.g., information indicating the altitude in cm) to flight control unit 303. Direction measurement unit 306 measures the direction in which the front of the host device is facing, and supplies direction information indicating the measured direction (e.g., when true north is taken as 0 degrees, information indicating an angle to 360 degrees from each direction) to flight control unit 303.

Flight control unit 303 controls the flight of the host device on the basis of the repeatedly-supplied position information, altitude information, and direction information, in addition to the above-described flight control information. Flight control unit 303 controls the altitude of the host device so that the measured altitude remains at the flight altitude indicated by the flight control information, for example (altitude control). Flight control unit 303 also controls the flight speed of the host device so that changes in the measured position, i.e., the speed, remains at the flight speed indicated by the flight control information (speed control).

Flight control unit 303 also controls the flight altitude and the flight direction so that the host device stays within a quadrangular (square, in the present embodiment) range centered on coordinates of a line connecting the previous target point coordinates with the next target point coordinates (airspace passage control). This quadrangle expresses the boundaries of the flight airspace, corresponds to cross-section when the flight airspace is segmented by a plane orthogonal to the travel direction, and has a length on one side corresponding to the spatial width of the flight airspace.

Flight control unit 303 controls the host device on the basis of the measured position and altitude, and the dimensions of the host device (vertical dimensions and horizontal dimensions) so that the host device stays within the quadrangular range. When the target point coordinates approach, flight control unit 303 controls the flight speed so as to reduce the flight speed if the arrival will be before the target arrival time and increase the flight speed if the arrival will be after the target arrival time (arrival control).

Next, allocation of flight airspace on the basis of allocation results will be described. When flight airspace allocation unit 102 receives allocation requests (flight schedule information meaning allocation requests) from multiple business operators, flight airspace is allocated for each business operator, giving priority to a high priority business operator according to the allocation results accumulated in allocation result accumulation unit 104. The priority referred to here means, in a case where there is a portion that overlaps in the flight airspace tentatively determined for multiple drones 30 (overlapping airspace), and that overlapping airspace is not to be shared, the priority ranking when determining drone 30 to which the overlapping airspace will be allocated.

In the present embodiment, flight airspace allocation unit 102 allocates flight airspace by assigning a higher flight priority to business operators with smaller allocated airspace amounts accumulated in allocation result accumulation unit 104 (allocated airspace amounts). For example, in the example of FIG. 10, as described above, accumulation is such that allocated airspace amount SumA1 of A business operator>allocated airspace amount SumA3 of C business operator>allocated airspace amount SumA2 of B business operator. In this case, for example, when the flight airspace of drone 30*a*-1 of A business operator and the flight airspace of drone 30*c*-1 of C business operator overlap and are not shared, flight airspace allocation unit 102 officially allocates the overlapping airspace to drone 30*c*-1, giving priority to C business operator, which has the smaller amount of allocated airspace. Then, flight airspace allocation unit 102 reviews the flight airspace to be allocated for drone 30*a*-1.

Also, when the flight airspace of drone 30*b*-1 of B business operator and the flight airspace of drone 30*c*-1 of C business operator overlap and are not shared, flight airspace allocation unit 102 officially allocates the overlapping airspace to drone 30*b*-1, giving priority to B business operator, which has the smaller amount of allocated airspace. Note that in a case where flight airspaces of drones 30 of the same business operator overlap each other and are not shared, for example, the above-described method for determining the priority at the stage where allocation results have not been accumulated (in which higher priority is given to overlapping airspace having an earlier estimated flight period) is used by flight airspace allocation unit 102.

Also, in a case where it is not determined that flight airspaces overlap for drones 30 of three or more business operators and all drones 30 share the overlapping airspace, in the present embodiment, flight airspace allocation unit 102 merely determines that the business operator having the smallest amount of allocated airspace has the highest priority, and officially allocates the overlapping airspace to drone 30 of that business operator. For example, in a case where flight airspaces of drone 30*a*-1 of A business operator, drone 30*b*-1 of B business operator, and drone 30*c*-1 of C business operator overlap and are not shared, airspace allocation unit 102 gives highest priority to B business operator, which has the smallest amount of allocated airspace, and officially allocates the overlapping airspace to drone 30*b*-1.

Flight airspace allocation unit 102 determines with respect to drones of the highest priority business operator and drones that fly in the same direction in the overlapping airspace that the overlapping airspace is to be shared. For example, in the above example, when drone 30*b*-1 flies in the same direction as drone 30*c*-1 in the overlapping airspace, flight airspace allocation unit 102 determines that the overlapping airspace is to be shared with the drone 30*b*-1 also, and officially allocates that overlapping airspace. When all drones 30 fly in the same direction in the overlapping airspace, flight airspace allocation unit 102 merely determines that the overlapping airspace is shared by all drones 30, and therefore does not determine priority itself.

On the basis of the configuration described above, the apparatuses included in drone operation management system 1 carries out an allocation process for allocating flight airspace and flight permission periods to drones 30.

Figure 12:
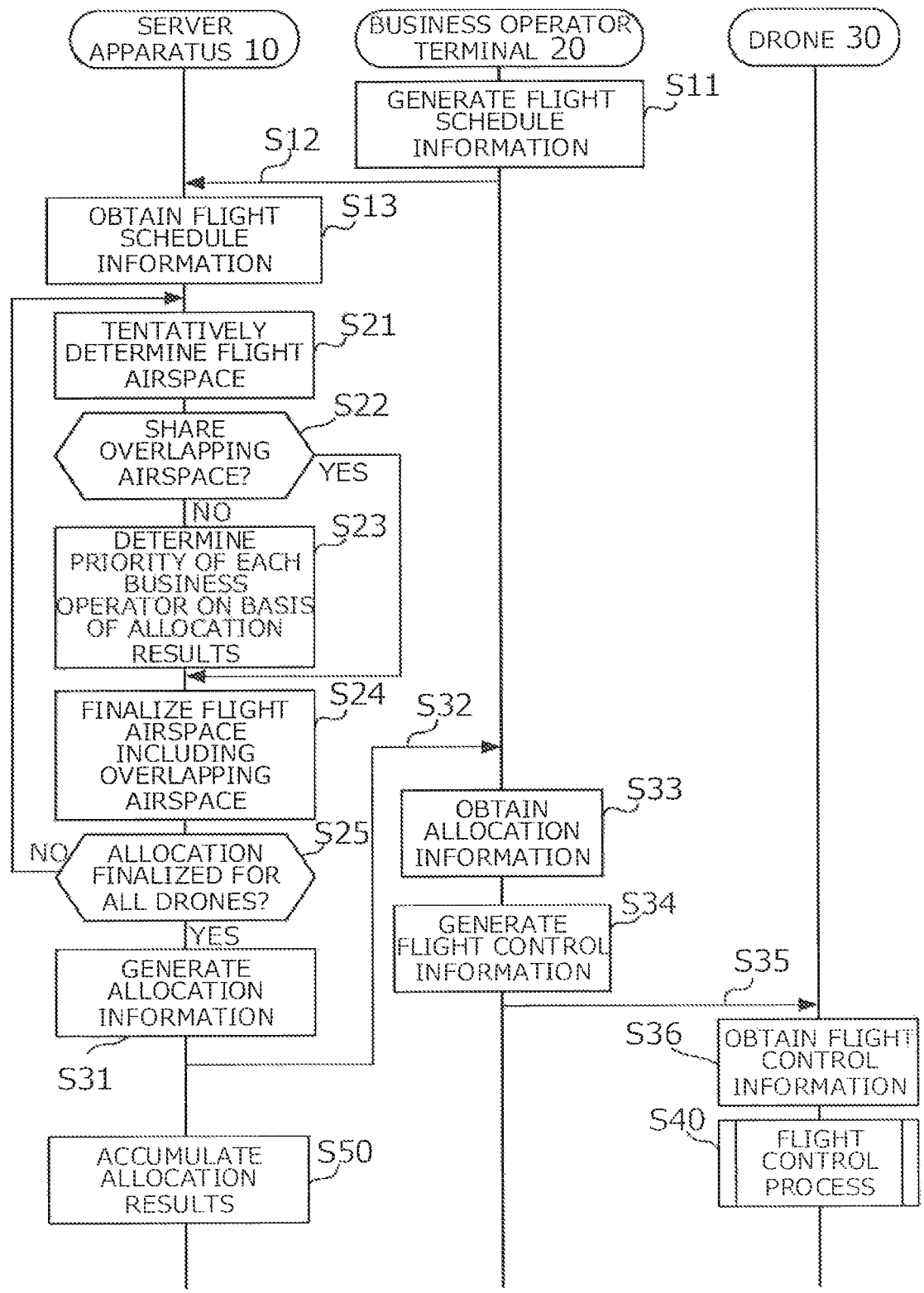
FIG. 12 is a diagram illustrating an example of operation sequences carried out by apparatuses in an allocation process.

FIG. 12 illustrates an example of operation sequences carried out by the apparatuses in the allocation process. This operation sequence is started upon a business operator of drone 30 inputting the flight schedule into business operator terminal 20, for example. First, business operator terminal 20 (flight schedule generation unit 201) generates the flight schedule information as illustrated in FIG. 5 (step S11).

Next, business operator terminal 20 (flight schedule transmission unit 202) transmits the generated flight schedule information to server apparatus 10 (step S12). Server apparatus 10 (flight schedule obtainment unit 101) obtains the flight schedule information transmitted from business operator terminal 20 (step S13). Then, server apparatus 10 (flight airspace allocation unit 102) tentatively determines a flight airspace to be allocated to drone 30 for which the flight schedule is indicated by the obtained flight schedule information (step S21).

Next, when overlapping airspace has been allocated to two or more drones 30 in step S21, server apparatus 10 (flight airspace allocation unit 102) determines whether or not to share the overlapping airspace (determines whether or not sharing is possible) (Step S22). When server apparatus 10 (flight airspace allocation unit 102) determines in step S22 not to share the overlapping airspace (NO), the priority of each business operator is then determined on the basis of the allocation results accumulated in its own apparatus (step S23).

Server apparatus 10 (flight airspace allocation unit 102), when determined in step S22 to share the overlapping airspace (YES), after determining the priority of each business operator in step S23, finalizes the official allocation of flight airspace including overlapping airspace (step S24). Specifically, in the case of sharing, server apparatus 10 (flight airspace allocation unit 102) finalizes the allocation for all drones 30 for which airspace overlaps, and when priority has been determined, finalizes allocation for drone 30 of a business operator having high priority. Then, server apparatus 10 determines whether or not the allocation has been finalized for all drones 30 (step S25), and carries out the processing from step S21 again if it is determined that the allocation has not been finalized (NO).

If it is determined in step S25 that the allocation is finalized (YES), server apparatus 10 (flight airspace allocation unit 102) generates the allocation information as indicated in FIG. 9, in which the tentatively-determined flight airspace and flight permission periods are finalized as official (step S31), and transmits the generated allocation information to business operator terminal 20 (step S32). Business operator terminal 20 (allocation information obtainment unit 203) obtains the transmitted allocation information (step S33). Next, business operator terminal 20 (flight control information generation unit 204) generates the flight control information as illustrated in FIG. 11 on the basis of the obtained allocation information (step S34).

Business operator terminal 20 (flight control information transmission unit 205) transmits the generated flight control information to the target drone 30 (step S35). Drone 30 (flight control information obtainment unit 301) obtains the transmitted flight control information (step S36). Drone 30 carries out the above-described flight control processing on the basis of the obtained flight control information (step S40). Server apparatus 10 (allocation result accumulation unit 104) accumulates the allocation results of the flight airspace for each business operator finalized in step S25 (step S50). The allocation results accumulated in step S50 are used next when determining the priority in step S23.

In the present embodiment, as described above, the information representing the allocated airspace amount (the number of allocated cells and the allocation periods) is accumulated as the allocation results of the flight airspace for each business operator, and when the allocated airspaces overlap between business operators, it is determined that a business operator for which a smaller allocated airspace amount has been accumulated is higher in priority, and overlapping flight airspace is officially allocated to that business operator. Therefore, it is possible to adopt a configuration in which, for example, even when there are too many allocation requests for an airspace where flight is permitted and so there exists drone 30 to which flight airspace cannot be allocated although requested, flight airspace can be reliably allocated to drone 30 of a business operator for which a smaller allocated airspace amount has been accumulated.

Also, assuming that overlapping airspace has been allocated to a business operator for which a larger allocated airspace amount has been accumulated, the allocation of flight airspace is biased toward that business operator. In the present embodiment, by allocating the flight airspace as described above, it is possible to suppress bias of flight airspace allocation to some business operators in that way, in comparison to a case where overlapping airspace is allocated to a business operator for which a larger allocated airspace amount has been accumulated or a case of determining drone 30 to which overlapping airspace is to be allocated without considering the allocated airspace amount.

2. Variations

The above-described embodiment is merely one example for carrying out the present invention, and the following variations are possible as well.

2-1. Flight Airspace

In the embodiment, flight airspace allocation unit 102 allocated the flight airspace using cubic cells, but the flight airspace may be allocated using a different method. For example, flight airspace allocation unit 102 may use parallelepiped cells instead of cubic cells, or may arrange cylindrical cells with their axes following the travel direction and use those cells as the flight airspace. Instead of cells, flight airspace allocation unit 102 may allocate flight airspace by expressing points, lines, and planes serving as the boundaries of the flight airspace through equations and ranges of spatial coordinates.

Additionally, in the embodiment, flight airspace allocation unit 102 allocates flight airspace including only cells of a constant height, as indicated in FIG. 6. However, flight airspace including cells of different heights (flight airspace including movement in the vertical direction) may be allocated as well. Furthermore, in the embodiment, flight airspace allocation unit 102 allocates flight airspace that uses east, west, south, and north as the travel directions. However, flight airspace that uses other directions (north-northeast, west-southwest, and so on) as travel directions may be allocated, and flight airspace including angular climbs and descents may be allocated as well. In sum, flight airspace allocation unit 102 may allocate any airspace as the flight airspace as long as it is airspace in which drone 30 can fly.

2-2. Consideration of Allocation Request

When determining the priority of allocation of flight airspace, flight airspace allocation unit 102 may consider not only allocation results but also the allocation request. In the present variation, flight air space allocation unit 102 determines the priority in consideration of the allocated airspace amount represented by the allocation request (flight schedule information) received from business operator terminal 20 in addition to the allocated airspace amount accumulated in allocation result accumulation unit 104.

Flight airspace allocation unit 102 tentatively determines the flight airspace to be allocated on the basis of the allocation request received from each business operator, calculates a total for each business operator of a value obtained by multiplying the allocation period by a value representing the size of the allocated cells of the tentatively determined flight airspace, and uses this as the flight schedule information transmitted from business operator terminal 20 of each business operator, that is, the airspace amount of the flight airspace requested by the allocation request (hereinafter referred to as the "requested airspace amount"). Flight airspace allocation unit 102 calculates, for example, requested airspace amounts ReqA1, ReqB1 and ReqC1 of A business operator, B business operator, and C business operator.

Flight airspace allocation unit 102 determines the priority in the same manner as in the embodiment by comparing a value obtained by adding the requested airspace amount calculated in this way to the allocated airspace amount that has been accumulated (that is, by comparing SumA1+ReqA1, SumB1+ReqB1, and SumC1+ReqC1), and then flight airspace allocation unit 102 finalizes the airspace to be allocated. In the present variation, as described above, priority is determined on the basis of the requested airspace amount represented by the allocation request, so for example, even if a business operator with fewer allocation results (a smaller allocated airspace amount) than other business operators has suddenly requested allocation of a large amount of flight airspace, it is not necessarily the case that priority of that business operator becomes high and all flight airspace is allocated according to that request.

As a result of the requested airspace being allocated, if the sum of the requested airspace amount and the allocated airspace amount is larger than that of the other business operators, the priority becomes lower than that of other business operators, so the flight airspace is not allocated. Thus, according to the present variation, as compared with the case where the priority is determined without considering the requested airspace amount, if there is a business operator that requests allocation of a large amount of flight airspace despite having few allocation results (a small amount of allocated airspace), it is possible to suppress bias in allocation of flight airspace to that business operator.

2-3. Number of Drones that Simultaneously Use Flight Airspace

Flight airspace allocation unit 102 may also determine priority on the basis of factors other than the allocated airspace amount and the requested airspace amount. For example, flight airspace allocation unit 102 may determine priority on the basis of the degree to which flight airspace allocated for each business operator has been shared with other drones 30. In the present variation, allocation result accumulation unit 104 accumulates the number of drones 30 that simultaneously use flight airspace (number of drones that simultaneously use flight airspace) as the allocation results of each business operator, with respect to flight airspace for which allocation has been finalized.

FIG. 13 shows an example of allocation results of the present variation. In the example of FIG. 13, in addition to the allocation results shown in FIG. 10, allocation result accumulation unit 104 accumulates the number of drones that simultaneously use flight airspace in each cell of the flight airspace for which allocation has been finalized. For example, num11 and num12 are accumulated as the number of drones that simultaneously use flight airspace of allocated cells $C_{50\text{-}20}$ and $C_{49\text{-}20}$ of A business operator. Note that in the example of FIG. 13, different reference signs such as num11 and num12 may represent the same number of drones. The number of drones that simultaneously use flight airspace indicates the number of drones 30 sharing a cell when the corresponding cell is an overlapping cell and has been shared.

When multiple cells are overlapping, it is not necessarily the case that multiple drones 30 fly simultaneously in one cell. For example, if two drones 30 fly one cell apart in the same direction, they will not fly simultaneously in the same cell. However, looking at the whole of overlapping cells, they will be used simultaneously by those two drones 30. Therefore, in this case, allocation result accumulation unit 104 accumulates the number "2" as the number of drones that simultaneously use flight airspace of each cell included among overlapping cells.

Flight space allocation unit 102 determines the priority by assigning a weight corresponding to the number of drones that simultaneously use the flight airspace to the airspace amount of the flight airspace used when determining the priority. For example, in the embodiment for A business operator, flight airspace allocation unit 102 calculates an equation Vol1×wt11+Vol1×wt12+ . . . =allocated airspace amount SumA1, but in the present variation, the value of each cell is divided by the number of drones that simultaneously use flight airspace to calculate Vol1×wt11÷ num11+ Vol1×wt12÷ num12+ . . . =allocated airspace amount SumA1.

If this calculation method is used, the allocated airspace amount decreases to the extent the business operator has been allocated a cell where a large number of drones simultaneously use the flight airspace, so priority tends to increase. Conversely, the allocated airspace amount increases to the extent the business operator has been allocated a cell where a small number of drones simultaneously use the flight airspace, that is, the allocated airspace amount increases to the extent the business operator has been allocated many dedicated cells, so priority tends to decrease. Note that in the above example, only the allocated airspace amount is used as the airspace amount of the flight airspace used when determining the priority, but the requested airspace amount described in the above variation may also be used.

In that case, flight airspace allocation unit 102 tentatively determines the flight airspace on the basis of the allocation request, and divides the value of each cell when calculating the requested airspace amount on the basis of the tentatively determined flight airspace by the number of drones that simultaneously use flight airspace, thus weighting by the number of drones that simultaneously use flight airspace. Also, instead of assigning weights to each cell, a collective weight corresponding to the number of drones that simultaneously use flight airspace may be assigned to the allocated airspace amount that was calculated. In this case, for example, a value obtained by dividing the allocated airspace amount calculated by the same method as in the embodiment by an average value of the number of drones that simultaneously use flight airspace may be used as the allocated airspace amount (here, the allocated airspace amount decreases as the average value of the number of drones that simultaneously use flight airspace increases).

Allocation of dedicated flight airspace is more likely than allocation of shared flight airspace to give a business operator the impression that risk of collision is less and therefore the business operator is favored. Conversely, when a business operator receives a small amount of dedicated allocation, an impression is given that other business operators are favored. In the present variation, by making it easier for a business operator with a small amount of dedicated allocation to have a higher priority, it is possible to increase the feeling of fairness between business operators as compared to a case where priority is determined without considering allocation results regarding dedicated/shared allocation.

2-4. Attributes of Flight Airspace

Flight airspace allocation unit 102 may determine priority on the basis of allocation results other than the allocated airspace amount. In the present variation, flight space allocation unit 102 determines the priority by assigning a weight corresponding to an attribute of flight airspace to the airspace amount of the flight airspace used when determining the priority. The attribute used in this determination is, for example, the speed limit in the flight airspace.

For example, there are cases where the flight airspace is divided into a high speed flight airspace where high speed flight is permitted and a low speed flight airspace where low speed flight is required. As described above, in a case where flight airspaces having different speed limits are mixed, flight airspace allocation unit 102 determines the priority in consideration of the speed limit that has been set for the allocated flight airspace. In the present variation, as allocation results, allocation result accumulation unit 104 accumulates attributes of the flight airspace for which the allocation has been finalized.

FIG. 14 shows an example of allocation results of the present variation. In the example of FIG. 14, in addition to the allocation results shown in FIG. 10, allocation result accumulation unit 104 accumulates the speed limit of the allocated flight airspace in association with each operator business as an attribute of the flight airspace. For example, Slmt11 and Slmt12 are accumulated as the speed limits of the allocated cells C50_20 and C49_20 of A business operator. Note that in the example of FIG. 14, different reference signs such as Slmt11 and Slmt12 may represent the same speed limit.

Flight space allocation unit 102 determines the priority by assigning a weight corresponding to the speed limit in the flight airspace to the airspace amount of the flight airspace used when determining the priority. For example, in the embodiment for A business operator, flight airspace allocation unit 102 calculates an equation Vol1×wt11+Vol1×wt12+ . . . =allocated airspace amount SumA1, but in the present variation, the value of each cell is multiplied by the speed limit to calculate Vol1×wt11×Slmt11+Vol1×wt12×Slmt12+ . . . =allocated airspace amountSumA1.

If this calculation method is used, the allocated airspace amount decreases to the extent the business operator has been allocated many cells where the speed limit is low, so priority tends to increase. Conversely, the allocated airspace amount increases to the extent the business operator has been allocated many cells where the speed limit is high, so priority tends to decrease. Note that in the above example, only the allocated airspace amount is used as the airspace amount of the flight airspace used when determining the priority, but the requested airspace amount described in the above variation may also be used. In that case, flight airspace allocation unit 102 may calculate the priority by assigning a weight corresponding to an attribute (for example, the speed limit) of the flight airspace also to the requested airspace amount.

Allocation of high speed flight airspace allows drone 30 to arrive at a destination earlier than with allocation of low speed flight airspace, so allocation of high speed flight airspace is likely to give a business operator the impression that the business operator is favored. Conversely, when a business operator receives a small amount of high speed flight airspace allocation, an impression is given that other business operators are favored. In the present variation, by making it easier for a business operator with a small amount of high speed flight airspace allocation to have a higher priority, it is possible to increase the feeling of fairness between business operators as compared to a case where priority is determined without considering the speed limit of allocated flight airspace.

Note that, other the speed limit, for example, an attribute of sharing permission may be used as an attribute of the flight airspace. In that case, weighting may be performed such that the allocated airspace amount decreases as the number of cells with the shareable attribute increases. Also, in a case where an attribute of a shareable number of drones (the number of drones 30 for which sharing is permitted) is defined in addition to the sharing permission attribute, that shareable number of drones may also be used. In that case, weighting may be performed such that the allocated airspace amount decreases as the shareable number of drones in each cell increases. In any case, by making it easier for a business operator likely to feel that other business operators are favored to have a higher priority, it is possible to increase the feeling of fairness between business operators.

2-5. Time Zone with Many Allocation Requests

Flight airspace allocation unit 102 may determine priority on the basis of the allocation results other than the allocated airspace amount. As described above, business operator terminal 20 transmits the flight schedule information to make an allocation request, and the flight schedule information includes the estimated departure time and the estimated arrival time. In the allocation request, these times represent a time zone in which the drone 30 is allowed to fly. The time zone referred to here is a time zone appropriately defined by a providing business operator that provides drone operation management system 1, such as an hourly time zone centered on noon, for example.

Even in the same flight airspace, depending on the time zone in which drone 30 is allowed to fly, there are time zones in which there are many allocation requests and time zones in which there are few allocation requests. For example, there are many allocation requests in an early morning time zone when communication conditions are likely to be good, and there are few allocation requests in a lunch time zone when baggage is not easily received. Therefore, flight airspace allocation unit 102 may determine priority in consideration of whether flight airspace has been allocated for a time zone when there are many allocation requests, or flight airspace has been allocated for a time zone when there are few allocation requests.

In the present variation, allocation result accumulation unit 104 accumulates the following information as allocation results. Allocation result accumulation unit 104 accumulates, with respect to airspace for which allocation has been finalized, the amount of allocation requests (hereinafter referred to as the "allocation request amount") made in order to allow drone 30 to fly in the same time zone as drone 30 to which flight airspace has been allocated.

FIG. 15 shows an example of allocation results of the present variation. In the example of FIG. 15, in addition to the allocation results shown in FIG. 10, allocation result accumulation unit 104 accumulates the above-described allocation request amount in association with each allocation request.

Allocation result accumulation unit 104, for example, calculates a quantity of flight schedule information representing a time zone overlapping a flight permission period allocated to a target allocation request among flight schedule information that has been transmitted from business operator terminals 20 of all business operators, as the amount of allocation requests requesting flight airspace in the same time zone as the target allocation request. In the example of FIG. 15, allocation request amounts for the same time zone Req11, Req21 and Req31 are accumulated in association with respective allocation requests "D001 (third time)" of A business operator, "D002 (first time)" of B business operator, and "D003 (second time)" of C business operator.

Flight airspace allocation unit 102 determines the priority by assigning a weight corresponding to the allocation request amount of the flight airspace allocated in each allocation request of the business operator to the airspace amount of each business operator used when determining the priority. For example, in the embodiment for A business operator, flight air space allocation unit 102 calculates Vol1×wt11+Vol1×wt12+ . . . =allocated airspace amount SumA1. However, in the present variation, the allocation request amount accumulated in association with each allocation request is multiplied by the allocated airspace in the corresponding allocation requests to calculate the equation (Vol1×wt11+Vol1×wt12+ . . . )×Req11+ . . . =allocated airspace amount SumA1.

Note that not only the allocated airspace amount but also the requested airspace amount may be used as the airspace amount of the flight airspace used when determining the priority. In that case, flight airspace allocation unit 102 tentatively determines the flight airspace on the basis of the allocation request, and performs weighting by the allocation request amount in the same manner as described above when calculating the requested airspace amount on the basis of the tentatively determined flight airspace. A business operator having a larger allocation request amount in the same time zone has more allocation requests, in other words, this indicates that flight airspace in a popular time zone has been allocated to the business operator.

On the other hand, the allocated airspace amount calculated as described above is weighted such that the value of the allocated airspace amount increases for a business operator to which much airspace in a popular time zone is allocated. That is, flight space allocation unit 102 determines the priority of each business operator by assigning to the allocated airspace amount a weight such that priority increases for a business operator to which much airspace in a popular time zone is allocated. By weighting in this manner, the priority of a business operator to which much airspace in a popular time zone is allocated tends to decrease in comparison with a business operator to which a small amount of airspace in a popular time zone is allocated.

There is likely to be the impression that a business operator to which much airspace in a popular time zone is allocated is favored over a business operator to which a small amount of airspace in a popular time zone is allocated. Conversely, a business operator to which a small amount of airspace in a popular time zone is allocated is likely to have the impression that other business operators are favored. In the present variation, by making it easier for a business operator to which a small amount of airspace in a popular time zone is allocated to have a higher priority, it is possible to increase the feeling of fairness between business operators as compared to a case where priority is determined without considering the speed limit of allocated flight airspace.

2-6. Performance Degree of Drones

Flight airspace allocation unit 102 may determine priority on the basis of allocation results other than the allocated airspace amount. In the present variation, the higher the performance of drone 30, the faster and safer drone 30 can fly in the allocated flight airspace, and therefore, higher priority is given to a business operator who owns such high performance drones 30.

Figure 16:
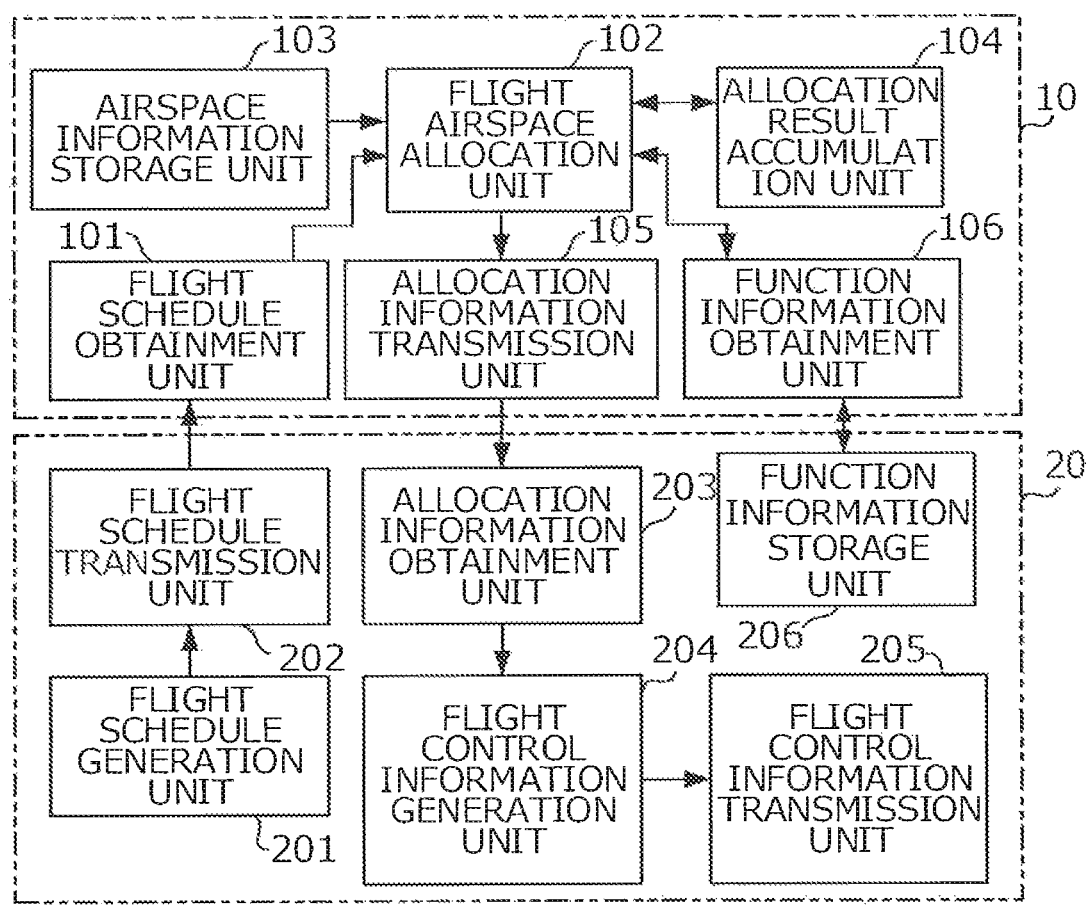
FIG. 16 is a diagram illustrating a functional configuration realized by a server apparatus and a business operator terminal according to a variation.

FIG. 16 shows a functional configuration realized by server apparatus 10d and business operator terminal 20d of the present variation. Server apparatus 10d includes function information obtainment unit 106 in addition to the units shown in FIG. 4, and business operator terminal 20d includes function information storage unit 206 in addition to the units shown in FIG. 4. In the present variation, in order to determine the priority of each business operator, flight airspace allocation unit 102 requests function information indicating the function of drone 30 that is the airspace allocation target from function information obtainment unit 106.

When the function information of drone 30 is requested from flight airspace allocation unit 102, function information obtainment unit 106 requests the function information indicating the function of drone 30 owned by each business operator from business operator terminal 20d of each business operator. Function information storage unit 206 of business operator terminal 20d stores function information of drone 30 whose operation is managed using business operator terminal 20d. This function information, for example, is created by the operation manager of drone 30 and stored in function information storage unit 206.

In the present variation, function information storage unit 206 stores function information indicating the maximum speed and longest cruising distance of each drone 30 owned by the business operator. When function information storage unit 206 receives a request from server apparatus 10d, function information storage unit 206 transmits the stored function information to server apparatus 10d. Function information obtainment unit 106 obtains the transmitted function information, that is, information indicating the degree of performance of drone 30 owned by each business operator, and supplies the obtained information to flight airspace allocation unit 102. Function information obtainment unit 106 is an example of an "obtainment unit" in the present invention.

Flight airspace allocation unit 102 determines the priority by assigning a weight corresponding to the degree of performance indicated by the function information obtained by function information obtainment unit 106 to the airspace amount of the flight airspace used when determining the priority, in the allocation results. The airspace amount of the flight airspace used when determining the priority is, for example, the allocated airspace amount accumulated in allocation result accumulation unit 104. Flight airspace allocation unit 102 calculates, for example, the average maximum speed and the average longest cruising distance of drones 30 owned by each business operator, and assigns a ranking to each business operator (in both cases, rank increases as the value increases). Flight airspace allocation unit 102 increases or decreases the coefficients (K1 and K2 in the embodiment) used when calculating the allocated airspace amount according to the ranking.

For example, when the average value of the maximum speed ranks first, flight airspace allocation unit 102 multiplies the coefficient by 0.8, when the average value of the maximum speed ranks second, flight airspace allocation unit 102 multiplies the coefficient by 1.0×, and when the average value of the maximum speed ranks third, flight airspace allocation unit 102 multiplies the coefficient by 1.2×. When the average value of the longest cruising distance ranks first, flight airspace allocation unit 102 multiplies the coefficient by 0.8, when the average value of the longest cruising distance ranks second, flight airspace allocation unit 102 multiplies the coefficient by 1.0×, and when the average value of the longest cruising distance ranks third, flight airspace allocation unit 102 multiplies the coefficient by 1.2×. As the coefficient increases, the allocated airspace amount increases and priority decreases, so a weight is assigned such that higher priority is given to a business operator having higher performance as indicated by the obtained function information. That is, flight airspace allocation unit 102 determines priority by assigning to the allocated airspace amount a weight such that priority increases for a business operator having higher performance as indicated by the obtained function information.

The performance used to determine priority is not limited to the maximum speed and the longest cruising distance, and for example, a maximum load weight (in this case as well, rank increases as the value increases) may be used. Also, the presence or absence of an avoidance function (a function realized by providing an object detection sensor) that avoids a collision with an obstacle, the presence or absence of a parachute function that alleviates an impact when falling, the presence or absence of a waterproof function, or the like may be used. In any of these cases, a drone having such a function has higher performance than a drone not having such a function, so a weight is assigned such that priority increases for a business operator with a higher proportion of drones having such a function.

Also, the requested airspace amount may be used as the airspace amount of the flight airspace used when determining the priority. In that case, flight airspace allocation unit 102 tentatively determines the flight airspace on the basis of the allocation request, and assigns a weight corresponding to the degree of performance indicated by the function information obtained in the same manner as described above when calculating the requested airspace amount on the basis of the tentatively determined flight airspace.

The higher the performance of the drone, the faster or safer it is to fly in the allocated flight airspace, so it is more likely that the drone can be flown according to the flight plan, and as a result it is less likely that this drone will affect other flight plans. In the present variation, by increasing the priority of a business operator that owns high performance drones, the allocated flight airspace can be used more effectively than in a case where priority is determined without consideration of drone performance.

2-7. Allocation without Priority if Airspace is Vacant

Because there is limited airspace where flight is permitted, in conditions where there are many allocation requests and the flight airspace becomes overcrowded (overcrowded conditions), there may be cases where flight in an estimated period is not possible, so it is necessary to fly in another period that is vacant. On the other hand, in conditions where there are not so many allocation requests that flight airspace become overcrowded (non-overcrowded conditions), even if flight airspaces overlap at the tentative determination stage, in many cases it is possible to fly within the estimated period if the flight airspace is changed.

In overcrowded conditions, drone 30 of a lower priority business operator flies in a different period than estimated, but in non-overcrowded conditions, even drone 30 of the lower priority business operator can fly in a period as estimated. In other words, in non-overcrowded conditions, flight airspace in which flight is possible is allocated in a period as estimated regardless of priority, so it is less necessary to determine priority than in overcrowded conditions.

Therefore, in the present variation, when the number of drones 30 for which an allocation request has been made is no more than a number defined according to the size of airspace that can be allocated (flight permitted airspace), it is determined that conditions are non-overcrowded conditions by flight airspace allocation unit 102, and airspace is allocated without using the priority of each business operator. As this number of drones, for example, the number of drones 30 permitted to fly in the flight permitted airspace in the same period (the number of flight permitted drones) is used. The number of flight permitted drones is defined by a providing business operator that provides drone operation management system 1 on the basis of, for example, the number of cells in the flight permitted airspace.

For example, in the airspace represented by the airspace information shown in FIG. 6, it is assumed that the number of cells in the flight permitted airspace is 5000 among 99×99=9801 cells. If the number of cells in the flight airspace allocated to one drone 30 is an average of 100 cells, the providing business operator calculates 5000÷100=50 drones as the number of flight permitted drones, and store this in server apparatus 10. Note that this calculation method is only one example, and other than this example, if there are many cases where flight airspace is shared, the number of flight permitted drones may be increased, or if there are many accidents where drones 30 collide with each other, the number of flight permitted drones may be decreased. Also, the number of flight permitted drones may be increased or decreased for other reasons.

Flight airspace allocation unit 102, at each instance of a certain time interval (for example, every 10 minutes), counts the number of drones for which there are overlapping flight schedule periods (a period from the estimated departure time to the estimated arrival time) indicated by the flight schedule information transmitted from each business operator terminal 20. Flight airspace allocation unit 102 specifies a time when the counted number of drones exceeds the number of flight permitted drones, and determines that conditions are non-overcrowded conditions through the flight schedule period with respect to drone 30 for which that time is not included in the flight schedule period, and then allocates airspace without using the priority of each business operator.

Also, flight airspace allocation unit 102, with respect to drone 30 for which the specified time is included in the flight schedule period, determines that conditions are overcrowded conditions in at least part of the flight schedule period, and allocates airspace using the priority of each business operator. Note that a configuration may be adopted in which flight airspace allocation unit 102, more specifically, determines that conditions are overcrowded conditions when the specified time is included in the estimated flight period (period in which flight in the overlapping air space is estimated) in the tentatively determined overlapping airspace, and determines that conditions are non-overcrowded conditions when the specified time is not included in the estimated flight period in the overlapping airspace.

In the present variation, when there is little need to determine priority as described above (in the case of non-overcrowded conditions), airspace is allocated without using priority, so in comparison to a case where priority is always used, it is possible to shorten the time needed until allocation is finalized for all drones 30 by eliminating processing for determining the priority.

2-8. Sharing Determination Method

Flight airspace allocation unit 102 may determine the presence or absence of sharing of overlapping airspace by a method different from the embodiment. For example, when all drones 30 or some (for example, half) of drones 30 have the above-described avoidance function that avoids a collision with an obstacle, collision between drones 30 are less likely to occur than in a case where they do not have the avoidance function, so flight airspace allocation unit 102 may determine to share overlapping airspace.

Also, in addition to the above case, flight airspace allocation unit 102 may determine to share overlapping airspace when drones 30 have the above-described parachute function, a function that transmits a signal indicating existence of a host device in another drone 30, or the like. In other words, flight airspace allocation unit 102 may determine to share overlapping airspace when drones 30 have some function to suppress a reduction in safety when overlapping space is shared. Also, even if that function is not possessed by all drones 30 whose flight airspaces overlap, flight airspace allocation unit 102 may determine to share overlapping airspace when some drones 30 have that function.

2-9. Comparison of Shareable Number of Drones

In the case of the embodiment, for example, flight airspace allocation unit 102 allocates overlapping airspace to drone 30 having the highest priority when tentatively determined flight airspace overlaps for three drones 30, and flight airspace is sharable for two of those three drones 30 but not shareable for one of those three drones 30. Here, if drone 30 having the highest priority is one of the two drones that can be shared, the overlapping airspace will be allocated to those two drones 30.

However, if drone 30 having the highest priority is the one drone that cannot be shared, the overlapping airspace is not allocated to that one drone. Also, when five drones 30 have overlapping airspace, and three of them and two of them respectively fly in the same direction in overlapping airspace (that is, they are shareable), if drone 30 having the highest priority is included among the three drones 30, overlapping airspace is allocated to those three drones 30, and if drone 30 having the highest priority is included among the two drones 30, overlapping airspace is allocated to those two drones 30.

As described above, when overlapping airspace is allocated to drone 30 having the highest priority and thus the number of drones for which overlapping airspace is shareable has decreased, flight airspace allocation unit 102 may allocate overlapping airspace to the combination of drones 30 that has the highest number of drones for which overlapping airspace is shared. Of course, if combinations have the same number of drones that can share airspace, overlapping airspace may be allocated to the combination of drones 30 including drone 30 having the highest priority. Thus, overlapping airspace can be used more effectively than in a case where overlapping airspace is allocated on the bases of priority alone.

2-10. Allocation Results

The allocation results are not limited to those described above. For example, although cell volume was used above as allocation results representing the size of the flight airspace, the flight distance when flying in the center of the flight airspace may be used as allocation results. Also, when the overlapping airspace has been tentatively determined, the number of times the priority is low and allocation has been reviewed may be used as the allocation results. In this case, flight airspace allocation unit 102 assigns the above-described weight such that priority is higher when allocation has been reviewed more times.

Also, the size of deviation of the allocated flight permission period with respect to the flight schedule period may be used as the allocation results. In this case, flight airspace allocation unit 102 assigns the above-described weight such that priority is higher when the deviation between those periods is greater. Also, when flight airspace is not allocated such that the flight distance from the departure point to the destination is the shortest distance, but rather, flight airspace is allocated such the flight distance becomes longer, the amount by which the flight distance increased from the shortest distance may be used as the allocation results.

In this case, flight airspace allocation unit 102 assigns the above-described weight such that priority is higher when the increase in the flight distance is greater. In any case, by making it easier to have a higher priority for a business operator that received an allocation giving the impression that other business operators are favored, it is possible to increase the feeling of fairness between business operators in comparison to a case where priority is determined without consideration of allocation results.

2-11. Aircraft

Although the embodiment describes using a rotary wing-type aircraft as an aircraft that carries out autonomous flight, the aircraft is not limited thereto. For example, the aircraft may be a fixed-wing aircraft, or may be a helicopter-type aircraft. Additionally, autonomous flight functionality is not necessary, and for example, a radio-controlled (wirelessly-operated) aircraft, which is operated remotely by a business operator, may be used, as long as the aircraft can fly in allocated flight airspace during in allocated flight permission period.

2-12. Apparatuses Implementing Respective Units

The apparatuses implementing the respective functions illustrated in FIG. 4 may be different from those shown in FIG. 4. For example, the functions of server apparatus 10 may be provided in business operator terminal 20, and the functions of business operator terminal 20 may be provided in server apparatus 10 (for example, business operator terminals 20 scattered throughout the country may be provided with airspace information storage units 103 storing airspace information of each region). In addition, server apparatus 10 may have the functions of business operator terminal 20 (for example, business operator terminal 20 displays an input screen and receives input operation, and server apparatus 10 is provided with flight schedule generation unit 201 and generates flight schedules). Additionally, each function of server apparatus 10 may be realized by two or more apparatuses. In sum, the drone operation management system may include any number of apparatuses as long as the functions of the drone operation management system as a whole are realized.

2-13. Category of the Invention

The present invention may be understood as information processing apparatuses, namely the server apparatus and business operator terminal 20, an aircraft, namely drone 30, as well as an information processing system, such as the drone operation management system including those apparatuses and the aircraft. The present invention can also be understood as an information processing method for implementing the processing executed by the respective apparatuses, as well as a program for causing a computer that controls the respective apparatuses to function. The program may be provided by being stored in a recording medium such as an optical disk or the like, or may be provided by being downloaded to a computer over a network such as the Internet and being installed so as to be usable on that computer.

2-14. Processing Sequences, Etc.

The processing sequences, procedures, flowcharts, and the like of the embodiments described in the specification may be carried out in different orders as long as doing so does not create conflict. For example, the methods described in the specification present the elements of a variety of steps in an exemplary order, and the order is not limited to the specific order presented here.

2-15. Handling of Input/Output Information, Etc.

Information and the like that has been input/output may be saved in a specific location (e.g., memory), or may be managed using a management table. The information and the like that has been input/output can be overwritten, updated, or added to. Information and the like that has been output may be deleted. Information and the like that has been input may be transmitted to other apparatuses.

2-16. Software

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and so on.

Additionally, software, commands, and so on may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, these hardwired technologies and/or wireless technologies are included in the definition of "transmission medium".

2-17. Information and Signals

The information, signals, and so on described in the specification may be realized using any of a variety of different techniques. For example, data, instructions, commands, information, signals, bits, symbols, chips, and so on that may be referred to throughout all of the foregoing descriptions may be realized by voltages, currents, electromagnetic waves, magnetic fields or magnetic particles, photo fields or photons, or any desired combination thereof.

2-18. Systems and Networks

The terms "system" and "network" used in the specification can be used interchangeably.

2-19. Meaning of "on the Basis of"

The phrase "on the basis of" used in the specification does not mean "only on the basis of" unless specifically mentioned. In other words, the phrase "on the basis of" means both "only on the basis of" and "at least on the basis of".

2-20. "And" and "Or"

In the specification, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

2-21. Variations, etc. on Embodiments

The embodiments described in the specification may be used alone, may be combined, or may be switched according to how the invention is to be carried out. Additionally, notifications of predetermined information (e.g., a notification that "X is true") are not limited to explicit notifications, and may be carried out implicitly (e.g., the notification of the predetermined information is not carried out).

Although the foregoing has described the present invention in detail, it will be clear to one skilled in the art that the present invention is not intended to be limited to the embodiments described in the specification. The present invention may be carried out in modified and altered forms without departing from the essential spirit and scope of the present invention set forth in the appended scope of patent claims. As such, the descriptions in the specification are provided for descriptive purposes only, and are not intended to limit the present invention in any way.

REFERENCE SIGNS LIST

1 . . . Drone operation management system
10 . . . Server apparatus

20 . . . Business operator terminal
30 . . . Drone
101 . . . Flight schedule obtainment unit
102 . . . Flight airspace allocation unit
103 . . . Airspace information storage unit
104 . . . Allocation result accumulation unit
105 . . . Allocation information transmission unit
106 . . . Function information obtainment unit
201 . . . Flight schedule generation unit
202 . . . Flight schedule transmission unit
203 . . . Allocation information obtainment unit
204 . . . Flight control information generation unit
205 . . . Flight control information transmission unit
206 . . . Function information storage unit
301 . . . Flight control information obtainment unit
302 . . . Flight unit
303 . . . Flight control unit
304 . . . Position measurement unit
305 . . . Altitude measurement unit
306 . . . Direction measurement unit

What is claimed is:

1. An information processing apparatus comprising:
a processor configured to:
accumulate allocation results of each of a plurality of business operators requesting allocation of flight airspace along a flight path for a respective aircraft, wherein each allocation result is defined by at least one of a size of the flight airspace and a period in which flight in the flight airspace is permitted;
determine an airspace amount for each business operator, wherein the airspace amount is baaed on the allocation results accumulated over a period of time for each business operator; and
when an allocation request is received from each of the plurality of the business operators, allocate flight airspace for each respective aircraft by giving priority to a business operator having a higher priority according to the airspace amount associated with each business operator.

2. The information processing apparatus according to claim 1,
wherein the airspace amount being an allocated airspace amount with respect to flight airspace for which allocation has been finalized, and
wherein the processor is configured to allocate the flight airspace by assigning a higher priority to a one of the business operators for which the allocated airspace amount is smaller than the allocated airspace amount of another one of the business operators.

3. The information processing apparatus according to claim 2, wherein the processor is further configured to:
determine the priority by adding, to the allocated airspace amount that has been accumulated for each business operator, a respective quested airspace amount that is the airspace amount of the flight airspace requested by the allocation requests received from each of the plurality of business operators as determined for the allocated airspace amount.

4. The information processing apparatus according to claim 2,
wherein an attribute is defined for flight airspace, and
wherein the processor is configured to determine the priority by assigning a weight corresponding to the attribute of the flight airspace to the allocated airspace amount of the flight airspace used when determining the priority.

5. The information processing apparatus according to claim 4,
wherein the attribute is a speed limit in the flight airspace.

6. The information processing apparatus according to claim 4, wherein the processor is further configured to:
accumulate, as the allocation results, a number of aircraft that simultaneously use flight airspace, with respect to flight airspace for which allocation has been finalized, and
determine the priority by assigning a weight corresponding to the number of aircraft in the flight airspace to the allocated airspace amount of the flight airspace used when determining the priority.

7. The information processing apparatus according to claim 2,
wherein a time zone in which the aircraft is allowed to fly is represented in the allocation request, and
wherein the processor is further configured to:
accumulate, as the allocation results, an amount of allocation requests performed in order to allow aircraft to fly in the same time zone as the aircraft to which flight airspace has been allocated, with respect to flight airspace for which allocation has been finalized, and
determine the priority by assigning a weight corresponding to the amount of allocation requests of each business operator to the allocated airspace amount of the flight airspace of each business operator used when determining the priority.

8. The information processing apparatus according to claim 2, wherein the processor is further configured to:
obtain information indicating a degree of performance of the respective aircraft owned by each business operator, and
determine the priority by assigning a weight corresponding to the degree of performance indicated by the obtained information to the allocated airspace amount of the flight airspace used when determining the priority.

9. The information processing apparatus according to claim 1, wherein the processor is further configured to:
perform allocation without using the priority when the number of aircraft for which allocation was requested is less than a number of aircraft defined according to the size of airspace that can be allocated,
wherein when response information indicating that the schedule of the at least one task may be changed is input, the integration unit integrates the schedules of the two or more scheduled tasks.

10. The information processing apparatus according to claim 1, wherein the allocated airspace amount is defined by both the size of the flight airspace and the period in which flight in the flight airspace is permitted.

11. The information processing apparatus according to claim 3, wherein the requested airspace amount is defined by both the size of the flight airspace and the period in which flight in the flight airspace is requested.

* * * * *

UNITED STATES PATENT AND TRADEMARK OFFICE
CERTIFICATE OF CORRECTION

PATENT NO. : 11,380,209 B2
APPLICATION NO. : 16/761383
DATED : July 5, 2022
INVENTOR(S) : Yamada et al.

It is certified that error appears in the above-identified patent and that said Letters Patent is hereby corrected as shown below:

In the Claims

- Column 31, Line 31, replace "baaed" with "based".

Signed and Sealed this
Ninth Day of August, 2022

Katherine Kelly Vidal
*Director of the United States Patent and Trademark Office*